United States Patent
Hodzic et al.

(10) Patent No.: US 12,505,097 B1
(45) Date of Patent: Dec. 23, 2025

(54) SYSTEMS AND METHODS FOR AUTOMATICALLY GENERATING BEST-FIT MODELS FOR TRAINING DATA

(71) Applicant: ARTI ANALYTICS, INC., Morgan Hill, CA (US)

(72) Inventors: Migdat Hodzic, San Jose, CA (US); Joerg Ferchau, Morgan Hill, CA (US); Tarik Hubana, Sarajevo (BA)

(73) Assignee: ARTI ANALYTICS, INC., Morgan Hill, CA (US)

( * ) Notice: Subject to any disclaimer, the term of this patent is extended or adjusted under 35 U.S.C. 154(b) by 0 days.

(21) Appl. No.: 19/251,329

(22) Filed: Jun. 26, 2025

Related U.S. Application Data

(60) Provisional application No. 63/692,337, filed on Sep. 9, 2024.

(51) Int. Cl.
*G06F 16/2452* (2019.01)

(52) U.S. Cl.
CPC ............... *G06F 16/2452* (2019.01)

(58) Field of Classification Search
CPC .................................................. G06F 16/2452
See application file for complete search history.

(56) References Cited

U.S. PATENT DOCUMENTS

| | | | |
|---|---|---|---|
| 8,200,594 B1 | 6/2012 | Bleiweiss | |
| 8,775,332 B1 | 7/2014 | Morris et al. | |
| 10,073,763 B1 | 9/2018 | Raman et al. | |
| 10,324,457 B2 | 6/2019 | Neelakandan et al. | |
| 11,080,616 B2 | 8/2021 | Zeiler et al. | |
| 12,367,242 B2 * | 7/2025 | Ansari | G06N 3/098 |
| 2022/0014963 A1 | 1/2022 | Yeh et al. | |
| 2023/0076967 A1 * | 3/2023 | Lai | G06N 3/086 |

FOREIGN PATENT DOCUMENTS

CN 110378463 B 10/2019

OTHER PUBLICATIONS

Yang, AutoMMLab: Automatically Generating Deployable Models from Language, Instructions for Computer Vision Tasks pp. 1-20, (Feb. 23, 2024).*
Raschka, Python Machine Learning, Second Ed, pp. 1-595 (Year: 2017).*

(Continued)

*Primary Examiner* — Albert M Phillips, III
(74) *Attorney, Agent, or Firm* — Stephen E. Zweig

(57) ABSTRACT

Existing methods for implementing artificial intelligence (AI) models for given training data heavily depend on AI expertise, meaning that organizations need to hire experts to implement the AI model. The present invention discloses a method and process for a platform that eliminates the need to be proficient in AI and coding expertise by automating much of the process. The platform automatically evaluates and selects the best algorithms and methods for each presented problem and dynamically generates tailored AI models and workflows that meet the specific requirements of the particular training data and knowledge domains. The invention may also be configured to learn from experience and continuously improve over multiple sessions.

20 Claims, 11 Drawing Sheets

(56) References Cited

OTHER PUBLICATIONS

Wang, Evolving Deep Neural Networks by Multi-objective Particle SwarmOptimization for Image Classification, pp. 1-9 (Year: 2019).*
Gopinath, Beyond R-Squared: A Comprehensive Guide to Interpreting OLS Regression Outputs, pp. 1-29, (Jul. 27, 2024).*
Pettletier, 3 Simple Statistical Methods for Outlier Detection, pp. 1-17, (Jun. 18, 2024).*
Ogata, K, Modern Control Engineering (5th ed.). Prentice Hall, Chapter 5, p. 161.

\* cited by examiner

FIG. 7

SYSTEMS AND METHODS FOR AUTOMATICALLY GENERATING BEST-FIT MODELS FOR TRAINING DATA

CROSS REFERENCE TO RELATED APPLICATIONS

This application claims the priority benefit of U.S. provisional application 63/692,337, filed Sep. 9, 2024, the entire contents of which are incorporated herein by reference.

BACKGROUND OF THE INVENTION

Field of the Invention

The present disclosure is in the field of artificial-intelligence-based hardware and software systems that can take training data from a particular knowledge domain, clean it, use it to train a plurality of candidate knowledge domain specific AI-models, and determine an optimized knowledge domain-specific AI model. This model can then be used to respond to various types of queries.

Description of the Related Art

Prior art in this area includes US and Chinese patent and patent applications CN110378463, U.S. Pat. Nos. 11,080, 616, 8,775,332, US20220014963, U.S. Pat. Nos. 10,324, 457, 8,200,594, and 10,073,763, the entire contents of which are incorporated herein by reference.

BRIEF SUMMARY OF THE INVENTION

The present invention is directed to a system and method to implement an artificial intelligence (AI) platform designed to simplify the implementation of AI models to fit various types of knowledge domain specific training data. In particular, the invention is designed to use AI-enhanced methods to automatically prepare and clean up this knowledge domain specific training data, automatically determine which candidate knowledge domain specific AI models best fit this training data, and then an optimized (knowledge) domain specific AI model best fits this training data. In some embodiments, the system can do this utilizing agentic methods, and without requiring that the user be able to write code, thus making advanced AI data modeling technologies accessible to non-experts. For brevity, the "invention" is also referred to in the alternative as the "system" and also as "the method."

Here, for brevity, the term "domain" will often be used to refer to one or more "knowledge domains." These domains essentially represent specific areas of expertise in one or more subjects. These subjects can represent any of broad areas of knowledge (e.g. academic subjects such as physics, biology, medicine, art) etc., but often will represent rather narrow areas of expertise (e.g. specialized areas of knowledge) such as might be obtained by a trained expert after studying certain narrow aspects of a certain subject.

In some embodiments, this invention can reduce or eliminate the need for coding language proficiency by automatically choosing which data cleaning, dimensionality reduction, data fusion, choice of Machine Language platform (or stack), methods of iteratively training the chosen ML stack, as well as validating and optimizing the results.

Put alternatively, in some embodiments, the invention may be viewed as a system and method for automatically evaluating and selecting the optimal algorithms and methods for each specific knowledge domain, problem and associated training data set. This capability is augmented by the platform's unique ability to learn and adapt over time, optimizing performance and results continuously. This continuous improvement helps to the platform to deliver better outcomes, giving users confidence in its reliability and effectiveness.

Unlike traditional monolithic or tightly coupled ML pipelines, the invention automates the entire pipeline—from training data ingestion, through training data cleaning, dimensionality reduction, and training data fusion, through automatically training various candidate domain-specific AI models, selecting the best candidates, through deployment and responding to query data—with dynamic orchestration across all stages. In some embodiments, Agents may be used to perform at least some of these specialized tasks, make decisions, and interact via APIs and local databases. In some embodiments, the invention includes a learning agent that evolves its domain-specific AI models over time by interacting with a shared knowledge base. In some embodiments, the invention may also be configured to accept user interaction through a UI agent that personalizes system performance based on user behavior. In some embodiments, at least some of the various "processing sages" (e.g., data preparation, training) (sometimes called "engines") can operates as a microservice with its own agent, API, and database.

The present invention can be viewed somewhat as operating as a "factory" for producing customized (knowledge) domain-specific AI models. AI agents and models rather than a static catalog of pre-built models. In contrast to existing systems that merely offer a library of available AI models (often limited to previously trained models or primarily NLP/LLM-based tools), this invention is capable of dynamically generating new model architectures and workflows. Each AI solution is built on-the-fly to fit the specific knowledge domain, training data and requirements, rather than selected from a fixed set. This factory-like capability means the platform does not just reuse known models—it constructs tailored models and pipelines for each use case, providing a level of customization and innovation beyond the capabilities of model catalog systems like most prior art. By emphasizing creation over selection, the invention further distinguishes itself as an engine of AI model generation, delivering bespoke AI solutions where prior art platforms would be constrained to choose from existing options.

In some embodiments, the invention may use a user-friendly interface that guides users through the entire AI model deployment process, from data ingestion to model training, evaluation, testing, and deployment. This streamlined process ensures that organizations and individuals without specialized AI knowledge can efficiently apply AI models to their unique data sets and obtain customized, high-quality results, making the user experience comfortable and straightforward.

BRIEF DESCRIPTION OF THE DRAWINGS

For a further understanding of the objects and advantages of the present invention, reference should be had to the following detailed description, taken in conjunction with the accompanying drawing, in which like parts are given like reference numerals and wherein:

FIG. 7. is an example of an optional user interface dashboard in the data preparation step where the user can receive automatic recommendations from the system and choose whether to apply these suggestions, or override the suggestions.

DETAILED DESCRIPTION OF THE INVENTION

Glossary

Figure 1:
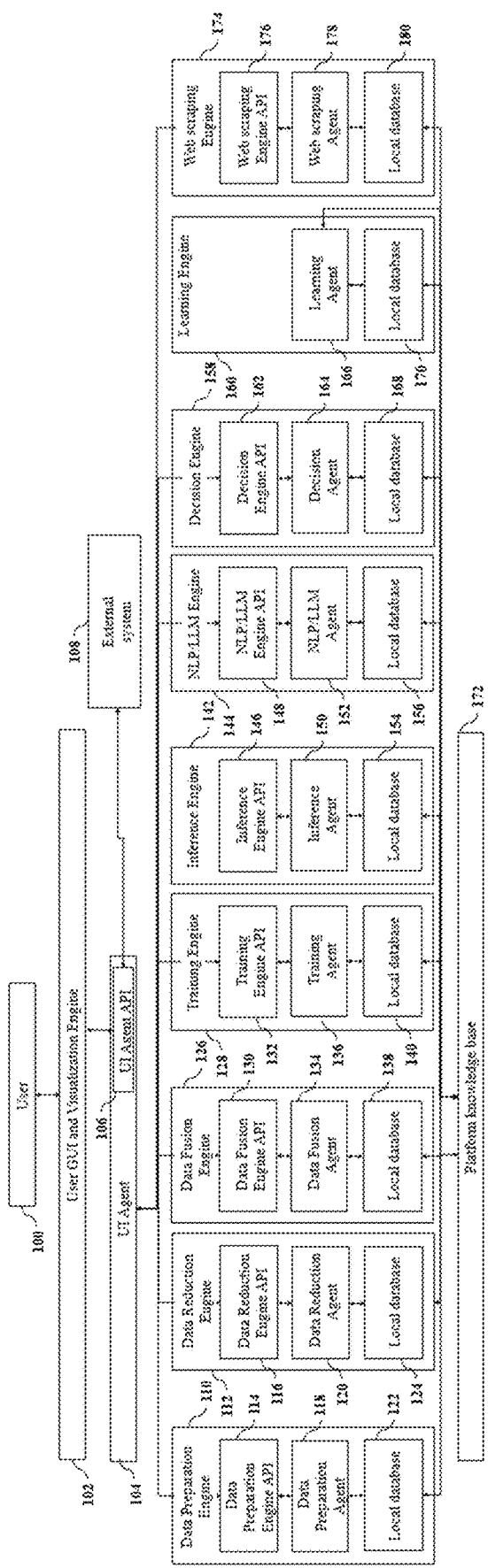
FIG. 1. is a block diagram depicting the method and process the improved artificial intelligence platform in accordance with the present invention.

Data and output: The system uses training data, usually from one or more knowledge domains, to automatically train itself. Once trained, the system also takes "query data" as input, uses its domain training to respond to the various queries with "output results."

Output type election: Depending on the situation, different types of output results may be desired, such as written output, numeric output, graphical output, and the like. Here, the user choice of output type is termed an "output type election."

Knowledge domains and Domain election. As previously discussed, this corresponds to the field of knowledge desired, usually corresponding to the training data. The system can store multiple knowledge domains, and the "domain election" can be used to help guide or inform the system as to which knowledge domains are likely to be most useful to use to respond to the upcoming query data.

Technology Stack: A general name for some of the specific AI models used by the platform.

Agent: A general name for certain portions of the system that can be configured to run in at least a semi-autonomous manner, often assisted by machine learning methods that are customized for that particular portion/agent.

In some embodiments, the invention may be an automated system or method for transforming query data and training data into output results using a plurality of process steps. Expressing the invention in a methods format, this method may comprise the steps of:

1) Receiving a plurality of training data, at least one output type election, and at least one knowledge domain election into computer memory.
2) Then using at least one processor to automatically clean this plurality of training data by correcting each the training data for any of low variance data, missing data, outlier data, and lack of normalization or statistical standardization in the training data, as well as any additional cleaning methods provided by a shared knowledge base, thus producing a plurality of (automatically) cleaned training data. This process is sometimes termed "automatic cleaning."
3) Then reducing the dimensionality of the plurality of cleaned training data by using at least one processor and any of principal component analysis (PCA), truncated singular value decomposition (SVD), linear discriminant analysis (LDA), and t-Distributed Stochastic Neighbor Embedding (SNE), on each the cleaned training data, thus producing a plurality of compacted cleaned training data.
4) Then using a Large Language Model (LLM) based data fusion engine and any of schema alignment, key matching, column normalization, and temporal and spatial joins algorithms to fuse the plurality of compacted cleaned training data, thus producing fused compacted cleaned training data.
5) Then using the fused compacted cleaned training data to iteratively train a candidate domain-specific AI model comprising any of an LLM coded model, machine learning model, or other neural network by iteratively training the candidate domain-specific AI model with a first training subset of the fused compacted cleaned training data, thus producing candidate domain specific AI models.
6) Then validating the candidate domain-specific AI models with a second validation subset of the fused compacted cleaned training data, and determining any of accuracy and training efficiency of the candidate domain-specific AI models using a third test subset of the fused compacted training data, and selecting an optimized domain-specific AI model from those iterations for optimized accuracy and efficiency criteria.
7) Storing the optimized domain-specific AI model and the knowledge domain election in the shared knowledge base.
8) Finally, receiving the query data, and using the knowledge domain election and any of the optimized domain-specific AI models or other optimized domain-specific AI models previously stored in the knowledge base to automatically generate output results according to the query data and the output election.

In some embodiments, the present invention may also be implemented as is a system and method for an agent-based, end-to-end, no-code AI software platform. Here, the AI software platform eliminates the need for a user (coder/programmer) to be proficient in specific coding languages by incorporating various available industry-standard technology stacks (e.g. Python, Pandas, NumPy, Matplotlib, SciPy, SKlearn, Tensorflow, Keras, XGBoost, Hugging face models, .NET) and specific-code domain expertise in the process. Additionally, by using an AI-agent-type approach, the platform evaluates and selects the best algorithms and methods for each presented problem and learns from its experience over time.

The rapid advancement and demonstrated capabilities of artificial intelligence (AI) technologies have significantly impacted various industries, leading to the development of sophisticated AI models capable of performing complex tasks. Traditionally, the implementation of AI models consists of a series of procedural steps, including data preparation, model training, evaluation, testing, and deployment. Each step is complex and demands a high level of domain-specific knowledge and technical proficiency. Consequently, organizations are often compelled to recruit AI and data science experts or assemble teams of specialists to manage and execute these processes effectively. This reliance on expert knowledge and the complexity of the various procedural steps presents a substantial barrier to the widespread adoption and integration of AI technologies across different business sectors.

As part of these steps, existing (prior-art) methodologies for deploying AI models typically involve manual coding and extensive customization tailored to the specific requirements of each use case. This approach inherently limits accessibility, as it assumes significant expertise in programming languages and familiarity with AI and machine learning (ML) frameworks and libraries. Moreover, the iterative nature of developing and refining AI models further extends the complexity and expense of the process, as it requires continuous monitoring, adjustment, and optimization by skilled professionals to find the best suiting data preprocessing methods and combine them with the best model for each use case. As a result, organizations without in-house AI capabilities or the financial means to outsource these functions face considerable challenges in leveraging AI technologies to their full potential.

The disclosed invention addresses these limitations by introducing a new method and process designed to simplify access to AI technologies by eliminating the need for proficiency in any coding language. Incorporating a comprehensive suite of various algorithms and AI methods (technology stacks) and encapsulating domain expertise within the platform enables users to deploy AI models without the prerequisite of specialized knowledge. The agent-based approach central to this invention is particularly noteworthy, as it empowers the platform to autonomously evaluate and select the most appropriate algorithms and methods for each presented problem. This adaptive capability is achieved through continuous learning, allowing the platform to optimize performance over time and deliver results that are tailored to the unique requirements of each use case completely automatically.

The present invention is not limited to implementations using large language model (LLM) agents. In various embodiments, the platform may comprise a diverse ensemble of specialized AI agents, each tailored to a particular task in the end-to-end pipeline—including, for example, agents for data preparation, data reduction, feature engineering, regression modeling, computer vision processing, and others. These agents may utilize different underlying AI techniques (not only natural language models) best suited to their specific functions. This clarifies that the "agents" of the platform encompass any algorithm or model that can autonomously perform a step in the AI workflow, ensuring the system leverages the most appropriate form of artificial intelligence for each stage rather than relying solely on LLMs.

Put alternatively, in some embodiments, the invention may further use at least one AI agent to automatically perform any of the process steps including cleaning, reducing dimensionality, fusing, training, validation, storing in one more local or shared knowledge bases, and automatically generating output results.

Furthermore, the agent-based end-to-end no-code AI platform significantly reduces the complexity and resource intensity traditionally associated with AI model implementation. Users have a streamlined, intuitive interface that guides them through the entire process, from data ingestion to model deployment. This design ensures that non-domain experts can effortlessly apply AI models to their own data sets and achieve optimal outcomes by following simple steps and recommendations. The platform's ability to automate the selection and application of AI algorithms not only enhances efficiency but also mitigates the risk of human error, thereby ensuring higher accuracy and reliability in the results.

In addition to its user-friendly interface and autonomous capabilities, the platform is designed to be scalable and adaptable, accommodating a wide range of use cases across different industries. The platform delivers high-quality, customized results, whether applied to predictive analytics such as regression and classification, clustering, natural language processing, image recognition, or other AI-driven tasks. This versatility underscores the transformative potential of the disclosed invention, as it enables organizations of all sizes and levels of technical expertise to use the power of AI.

The disclosed method and process represents a significant advancement in AI technologies. By eliminating the need for coding proficiency and embedding domain expertise (primarily data science, machine learning, artificial intelligence and software engineering) within an accessible, autonomous system, this invention democratizes AI implementation and empowers a broader spectrum of users to achieve superior results. The platform's innovative design and adaptive capabilities position it as a valuable tool for organizations seeking to integrate AI into their operations and drive innovation without the constraints of prior art approaches.

In some embodiments, the invention may be a system or method for transforming training data into output software code that models this data for a given code type and technology stack. This method can comprise training data, at least one given output code type election, and at least one given output technology stack. The output code type and technology stack are used to inform the system of the user's desired output code type and technology stack that can implement the model.

Here, the system or method prepares this training data for subsequent processing by using at least one processor and any of a graphical user interface (GUI, such as those shown in FIG. 6 and FIG. 7), and a data preparation software engine, thus producing prepared data. This prepared data may scrub the training data for various problems, such as duplicate data, missing values (which may be handled by interpolation), lack of normalization, lack of statistical standardization, and the like, thus producing prepared data.

The system/method then uses at least one processor and a data fusion engine to automatically analyze this prepared data, and determine at least one model that fits this data well-usually to a predetermined error criterion. In some embodiments, this process may be an iterative process where the system automatically tries multiple models, at least some of which may be AI-generated, and uses one or more training engines and inference engines to refine these models (e.g. for better fit to the underlying data, subject to various predetermined or AI-generated constraints).

Once at least one "good" fit is produced, based upon satisfying various best-fit and sanity check constraints, the at least one good-fit models, along with the given output code type, and the given output technology stack type, will be provided. Model types include, but are not limited to, tabular, text (NLP/LLM), audio and video models trained and deployed thorough the platform. Additionally, pre-trained models can be integrated and hosted either in the platform or third-party cloud server and ready to use and combine with other models and workflows in the system (e.g. OpenAI models, Llama, Mistra, DeepSeek). By combining multiple models and agents that use them, the platform offers building of complex workflows with different types of models used in different workflow steps.

FIG. 1 shows a block diagram depicting system and method in accordance with the present invention. In some embodiments, the user 100 interacts with the platform via an optional user interface that is generated in the "User GUI and Visualization Engine" block 102. In some embodiments, this user interface can also be supported by a user interface (UI) agent 104 configured to track that user's behavior, preferences, and subscriptions, and generate personalized suggestions and interfaces. In some embodiments, the optional UI agent can also interact with both the platform's "User GUI and Visualization Engine" 102 and also with external systems 108 via UI Agent APIs 106. In some embodiments, this UI agent may also connect to all engines of the platform except one (the learning engine 160), namely: the data preparation engine 110, data reduction engine 112, data fusion engine 126, training engine 128, inference engine 142, NLP/LLM engine 144 and decision engine 158.

In some embodiments, the learning engine 160 is often connected directly to the platform knowledge base 172 to learn from previous experience using logs, data, and metadata, often stored from previous sections. In some embodiments, at least some of the invention's various steps, modules, or "engines" may store and retrieve information from previous sections in that module, steps, or engine's local database (for data preparation engine 122, data reduction engine 124, data fusion engine 138, training engine 140, inference engine 154, NLP/LLM engine 156, decision engine 168 and learning engine 170), agent (for data preparation engine 118, data reduction engine 120, data fusion engine 134, training engine 136, inference engine 150, NLP/LLM engine 156, decision engine 164 and learning engine 166), and APIs in case they are connected with a UI agent (for data preparation engine 114, data reduction engine 116, data fusion engine 130, training engine 132, inference engine 146, NLP/LLM engine 148, decision engine 162). This structure can be, but is not limited to, the microservice architecture of the software platform.

Thus, as has been discussed, and will be discussed further, in some embodiments, the invention may be configured to further store the optimized domain-specific AI models and knowledge domain election in any of a shared knowledge base, or local engine-specific knowledge base. This can further include any of the training data, output type election, compacted cleaned training data; and fused compacted cleaned training data, preferably over a plurality of sessions.

Here, for any individual session, the system may use any of that session's knowledge domain election, output type election, compacted cleaned training data, and fused compacted cleaned training data to determine which optimized domain-specific AI model to use. This may be taken from either that session's newly generated optimized domain-specific AI models, or from previously stored optimized domain specific AI models. Either may be used to automatically generate the output results.

Figure 2A:
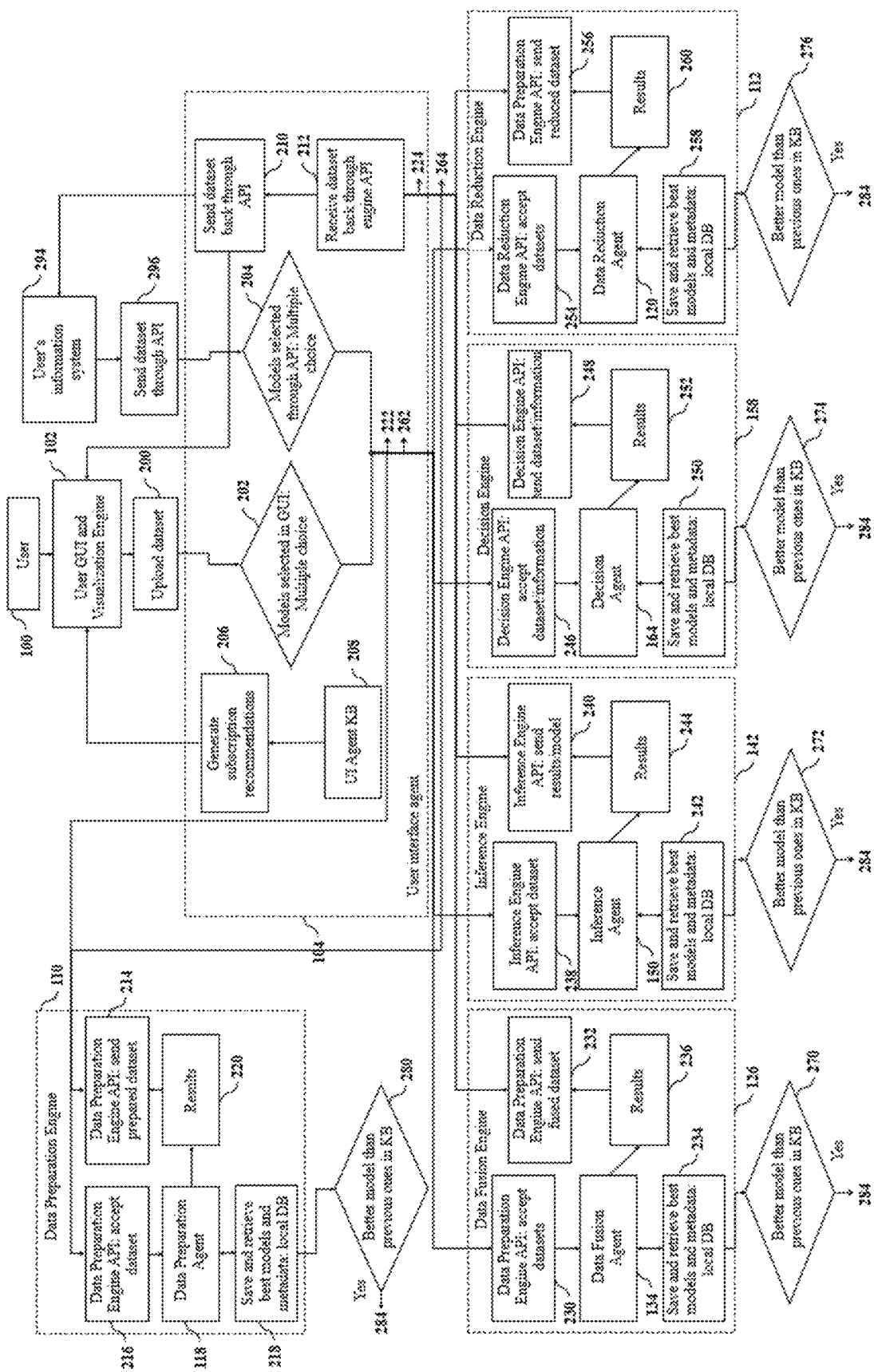
FIG. 2A. is a block diagram of transactions in the improved artificial intelligence platform in accordance with the present invention.
Figure 2B:
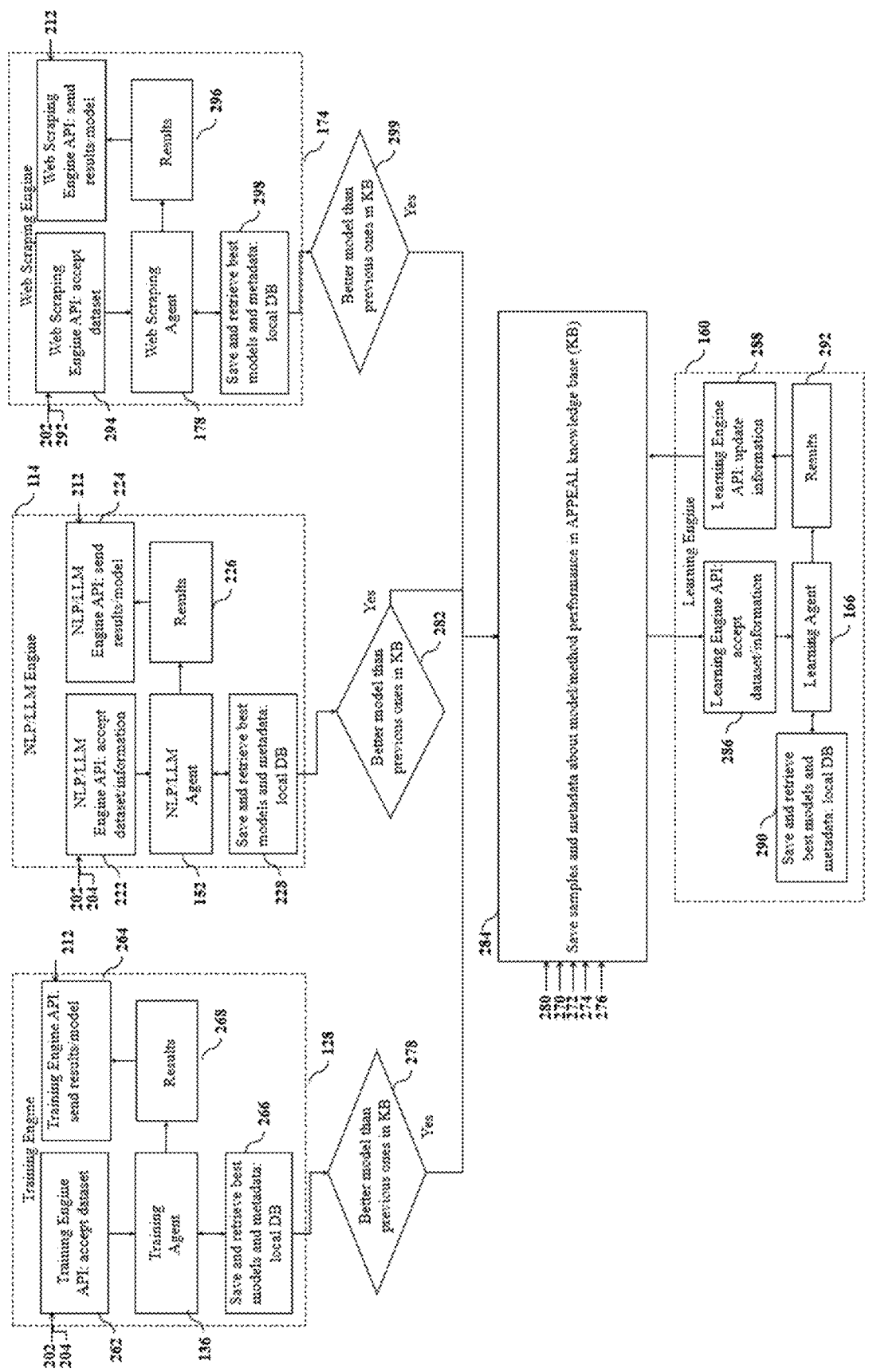
FIG. 2B is a block diagram showing further details of the transactions in the improved artificial intelligence platform in accordance with the present invention.

FIG. 2 shows a block diagram of transactions in the artificial intelligence platform in accordance with the present invention, providing a more procedural view than FIG. 1. The user 100 starts by uploading a training dataset (e.g., tabular, images, audio, video, text) 200 and selects the preferred knowledge domain selection (e.g., models/scenarios) 202, often using GUI and/or UI agent 104. If a UI agent (or intelligent GUI) is used, the UI agent 104 can be configured to learn user patterns that are stored in either the UI Agent knowledge base (KB) 208 (or the platform knowledge base 172) and may also generate subscription recommendations 206 if access to external optimized domain specific AI models or training data is recommended.

Users can interact with the optional UI agent via either the User GUI and visualization engine 102, or via the API 296 in case of external user's information system 294. Once the training dataset is uploaded, and info on the output type election and knowledge domain election (model selection) is received 204 the automated procedure starts.

Put alternatively, in some embodiments, the invention may further use at least one graphical user interface to either examine, enter or override any of the training data, output type election, knowledge domain election, any of the data cleaning methods, any of the dimensionality reduction methods, any of the data fusion methods, any of the LLM training methods, any of the validation methods, and choice of optimized domain-specific AI model.

The next step is the data preparation engine 110, which accepts the training dataset 216, and selects (optionally using an agent-based approach 118) to select suitable data preparation methods 220 according to any of a preset process or a machine learning process. This step can also optionally save the selected preset processes and metadata to either a local database (DB) 218 (or platform knowledge base 172), and passes the results through to the data reduction engine 112 and fusion engine 126. In some embodiments, this may be done by returning results to the UI agent 214, and/or passing the results through the UI agent 104

This data preparation step uses at least one of two main streams of data preparation: automated hard coded data engineering steps and LLM (GenAI) data preparation. Both processes start in parallel by conducting statistical analysis of the training datasets. This analysis can include calculation of percentage of missing values per column, distribution analysis, duplicate finding, detection of categorical data (rang of columns). This detailed statistical analysis serves as starting point for both automated hard coded flow and LLM (GenAI) flow.

The LLM (GenAI) flow starts with using the statistical analysis of the training dataset in textual form as part of the prompt context (e.g. output type election and/or knowledge domain election) together, with instructions to generate code to clean the dataset by using various data preparation practices as described herein. As result, the LLM will generate a code that can be outputted in a structured format ready to be applied at the dataset.

By contrast, the optional automated hard coded data flow uses rule-based algorithms to prepare the dataset. In one example, the process begins with calculating the percentage of missing values per column, which determines the appropriate method: rows with less than 5% missing values are removed; columns with 5% to 30% missing data are imputed using mean, median, or mode-selected based on a distribution analysis via D'Agostino's K-squared test; and for 30% to 60% missing values, the KNNImputer method may be applied, leveraging similarity between data samples for more accurate imputations. Columns with over 60% missing data are entirely removed. Finally, duplicates are identified and eliminated to prevent redundancy and maintain analytical accuracy. This layered approach ensures flexible, context-aware, and statistically sound data cleaning.

For example, in some embodiments, the process of automatically cleaning the plurality of training data comprises computing, for each column, a percentage of missing values and a normality score via D'Agostino's K-squared test and automatically deleting, imputing or dropping the columns. The system can further identify categorical columns by data type and distinct-value count, and encode each using One-Hot, Label, Ordinal, or Binary Encoding based on cardinality and downstream model requirements. The system can further detect outliers by applying Z-Score filtering for near-normal columns, IQR filtering for skewed columns, or an Isolation Forest for high-dimensional data. The system can further scale the numeric columns by min-max or robust (median/IQR) normalization, depending on each column's skewness.

Continuing with this example, after that, by analyzing categorical values in columns, a categorical feature encoder converts categorical variables into numerical formats suitable for machine learning models, with method selection based on variable type, cardinality, and model requirements. One-Hot Encoding may be applied for nominal variables without inherent order, especially when using models assuming feature independence—such as linear models and neural networks—or tree-based models that do not naturally handle categorical data. This method has the advantage of preventing misleading ordinal relationships but the drawback in that it increases data dimensionality, making it less suitable for variables with many categories. Label Encoding may be used when categorical variables have a natural ordinal relationship (e.g., rankings or grades) and models can interpret numeric order correctly, such as decision trees. Ordinal Encoding explicitly preserves order for naturally ordered categories, adding hierarchical information that benefits models sensitive to rank. For variables with high cardinality, Binary Encoding is preferred as a compromise, reducing dimensionality compared to One-Hot Encoding while avoiding artificial ordering introduced by Label Encoding. Dummy Encoding, like One-Hot but excluding one category as a baseline, is used primarily in statistical models to avoid multicollinearity issues. The system intelligently selects the encoding approach by computing, over the variety of different options, each variable's characteristics and intended model, balancing accuracy, interpretability, and computational efficiency.

In some embodiments, outlier detection methods tailored to different data characteristics and use cases may also be employed by the system. For example, the Z-Score method may be applied for data that is approximately normally distributed and requires identification of extreme values based on their distance from the mean. The IQR (Interquartile Range) method may be utilized for datasets where the distribution may be skewed or unknown, providing a robust way to detect outliers without assuming normality. For high-dimensional or complex data structures, the Isolation Forest algorithm may be used, as it effectively isolates anomalies without relying on any specific data distribution. The Local Outlier Factor (LOF) method may be deployed when local density variations are significant, allowing detection of points that are anomalous relative to their immediate neighbors. Finally, the Elliptic Envelope technique may be applied when the data follows a multivariate normal distribution, identifying outliers as points lying outside the expected covariance structure.

Various data transformation techniques are used throughout the system, each selected based on the nature of the dataset and the requirements of the analytical or modeling process. Standardization is applied when the data approximately follows a normal distribution or when algorithms require training features to have a mean of zero and a standard deviation of one, commonly in linear models and support vector machines. Normalization (min-max scaling) may be utilized when preserving relative differences between data points within a specific range—typically between 0 and 1—is essential, making it suitable for neural networks and distance-based algorithms such as clustering, especially when features have differing units but equal importance. MaxAbsScaler may be employed for datasets containing a mixture of positive and negative values and sparse data, scaling features according to their maximum absolute value without diminishing the influence of outliers or disrupting data sparsity. RobustScaler may be appropriate for datasets with significant outliers, as it scales data based on the median and interquartile range, thus providing robustness against extreme values. KernelCenterer may be specifically used in kernel-based machine learning methods, including support vector machines and kernelized principal component analysis, where centering the kernel matrix improves both the interpretability and performance of the models. The net effect of the above processes is to produce cleaned training data. Since a plurality of different training data will usually be input, the net effect is to produce a plurality of cleaned training data.

To reduce the dimensionality of this plurality of cleaned training data, a data reduction process, step (or engine) is used. This the data reduction engine accepts the plurality of cleaned training data (prepared dataset 254) produced by the previous cleaning step and data preparation engine, but with different underlying methods. Namely, the data reduction process, step, or engine works by using dimensionality reduction techniques to efficiently process high-dimensional data, leveraging both linear and nonlinear methods to extract the most informative features while preserving essential structural properties. Here, Principal Component Analysis (PCA) may be employed primarily for unsupervised linear dimensionality reduction when the goal is to capture the maximum variance in correlated variables, making it ideal for data compression and noise reduction. Truncated Singular Value Decomposition (SVD) may be used as a scalable alternative for large or sparse datasets where centering data is impractical, enabling efficient linear transformations without loss of key information. Linear Discriminant Analysis (LDA) may be applied in supervised settings to enhance class separability by maximizing the ratio of between-class variance to within-class variance, thus improving classification outcomes. For complex, high-dimensional datasets requiring nonlinear embeddings to preserve local neighborhood relationships, the system may use t-Distributed Stochastic Neighbor Embedding (t-SNE), which excels in visualizing intricate data structures where linear methods fall short. The net result of this step, process, or engine is to produce a plurality of compacted cleaned training data.

The data fusion engine accepts the compacted cleaned training dataset 230, and automatically select the best methods for data fusion (if applicable) 134. In some embodiments, this can be done using an agent-based approach. In some embodiments, the data fusion engine also saves it's selected best models/methods and metadata 236 to either its local database 234 or the platform knowledge base (172). It then can optionally return the results to the UI agent 232, and/or passes the results through the UI agent 104, or even back to the data reduction engine 112 if further size reduction is needed.

This Data Fusion step, process, or engine is designed to intelligently combine multiple heterogeneous datasets into a unified, analysis-ready structure. At the center of this process is a Large Language Model (LLM), which receives structured descriptions and analytical summaries of the training datasets. These summaries may include metadata such as schema details, data types, missing value patterns, sample distributions, and semantic context. Based on this input, the LLM evaluates the compatibility of the datasets and proposes an optimal fusion strategy.

The suggested fusion approach may involve operations such as schema alignment, key matching, column normalization, or temporal and spatial joins, depending on the nature of the data. Once the strategy is defined, the LLM automatically generates executable code (such as Python using libraries such as Pandas) to implement the fusion process. This allows for rapid prototyping and eliminates the need for manual coding in the early stages of integration.

In some embodiments, before data the data fusion step is fully executed, the user may be presented with a detailed explanation of the fusion logic and the generated code. This human-in-the-loop step can be useful both to ensure interpretability and correctness, as well as to give the user important feedback that the automated system is working properly. In such user feedback options, the human users can either approve the proposed fusion and initiate the process, or reject the output and refine the input instructions, prompting the LLM to iterate on a new fusion plan. This interactive loop, while optional, is useful because it enables a highly adaptive and user-guided fusion workflow, reducing integration time while preserving full control over the data engineering process. The net result of this stage is to produce fused compacted cleaned training data.

In some embodiments, the process of using an LLM-based data fusion engine comprises automatically generating a JSON summary of each compacted cleaned training dataset (listing column names, data types, sample counts, and schema identifiers) and concatenating these summaries with fusion instructions (e.g., "align schemas; match keys; normalize formats; perform temporal joins") into a single prompt.

This single prompt can then be submitted to a fine-tuned transformer LLM via API to generate Python code that reads each dataset into a DataFrame, renames and type-casts columns per a unified mapping, applies column normalization, merges DataFrames on specified keys, and writes a fused output file.

Here the system will typically be configured to automatically execute this generated script in a sandboxed container. Here, if any if runtime exceptions occur, the system can further be configured to re-submitting this runtime exceptions error, plus the original prompt to the LLM and repeat (iterate) until the fusion script runs successfully.

In the next step, the fused compacted cleaned training data is used to iteratively train a candidate domain-specific AI model. In some embodiments, this may be a Retrieval-Augmented Generation (RAG) LLM.

As shown in FIG. 2.2, training engine 128 (with respective blocks 262, 136, 268, 264 and 266), explores various candidate sets of fused compacted cleaned training data that have the best fit for training data. As neural networks are key architecture type that is used in the system among other machine learning approaches, the system automatically determines an optimal neural network architecture using a hybrid Neural Architecture Search (NAS) approach informed by an efficient compute frontier criterion to avoid exploring overly complex architectures that don't yield good results and improve the computational efficiency of the system.

Here, for example, in some embodiments, the process of validating the candidate domain-specific AI models can further use efficient compute frontier methods to determine training efficiency. These efficient compute frontier methods can be configured to determine, over a model/methods space, a point of diminishing returns where increasing theory or AI engine complexity or training time yields no significant improvement in performance.

Once a suitable prepared dataset (e.g. a suitable fused compacted cleaned training dataset) is received in the training engine, the training engine's agent employs a combination of search strategies to evaluate a broad range of model architectures. Each model architecture can be termed a "candidate domain-specific AI model".

To do this, each fused compacted cleaned training dataset is automatically split into three parts: training, validation, and testing, producing a first training subset, a second validation subset, and a third test subset of the original fused compacted cleaned training dataset. The first training subset is used to train each candidate domain specific AI-model, the second validation subset evaluates the fitness of each candidate domain specific AI-model, and the third testing subset is reserved for testing the final candidate candidate-domain specific AI models to determine which have the highest fitness.

In some embodiments, each candidate domain-specific AI model (neural network architecture) throughout the experiments is encoded as a single array.

The fitness function used throughout these experiments may be defined as the ratio of its accuracy to its training time:

$$\text{Fitness (candidate)} = \frac{\text{accuracy}}{\text{training time} \times ECF \text{ factor}}$$

The selected fitness function guides the search process toward architectures that achieve optimal performance within computational constraints by penalizing those candidate domain-specific AI models that are excessively resource intensive. Also, considering the efficient compute frontier factor (ECF factor) that should reflect the convergence of the structure during training, candidate domain-specific AI models with better structure convergence are preferred.

The ECF factor is calculated by collecting the data on the weight's updates between training iterations during the whole training cycle in following manner by using 63.2% (802, 806) exponential decay time constant approach:

$$ECF \text{ factor} = 0.632 \cdot \frac{\sum_{n=1}^{m} \lVert \text{weight}_{n,k-1}\rvert - \lvert\text{weight}_{n,k} \rVert}{m} + (1 - 0.632) \cdot * \left( \frac{\sum_{n=1}^{m} \lVert \text{weight}_{n,1}\rvert - \lvert\text{weight}_{n,2} \rVert}{m} \right)$$

Where:
k—number of iterations in training
m—total number of weights
$\text{weight}_{n,i}$—weight n value in i-th iteration ECF factor is calculated to reflect the neural network convergence time to favorize the better converging structures in the fitness function.

In the above calculation, the 63.2 value was inspired, in part, by the teaching of Ogata, K, Modern Control Engineering (5th ed.). Prentice Hall, Chapter 5, page 161. Ogata explains that the response of a first-order system to a unit step input reaches 63.2% of its final value at time $t=\tau$.

In some embodiments, the process of using the fused compacted cleaned training data to iteratively train a candidate domain-specific AI model can comprise using an LLM to generate Python code that imports requisite AI libraries (e.g., scikit-learn, TensorFlow, PyTorch), and splits the fused compacted cleaned training data into training, validation, and test subsets. This can also define a model architecture (e.g. a candidate domain-specific AI model) based on metadata and specified algorithmic parameters using (but not limiting to) the previously discussed ECF factors as part of the optimization function.

The system can then run (instantiate) and compile the (candidate domain-specific AI) model with a chosen loss function and optimizer, and invoke a training routine on the training subset with validation monitoring, as well as automatically executing the generated Python script in a sandboxed environment. Here, if a runtime exception (with an exception message) occurs during the generated Python script execution, the system can re-submit this exception message, along with the original prompt to the LLM to regenerate corrected Python code. The system can then iterate again until the script executes successfully (or some other time-out error occurs).

Figure 8:
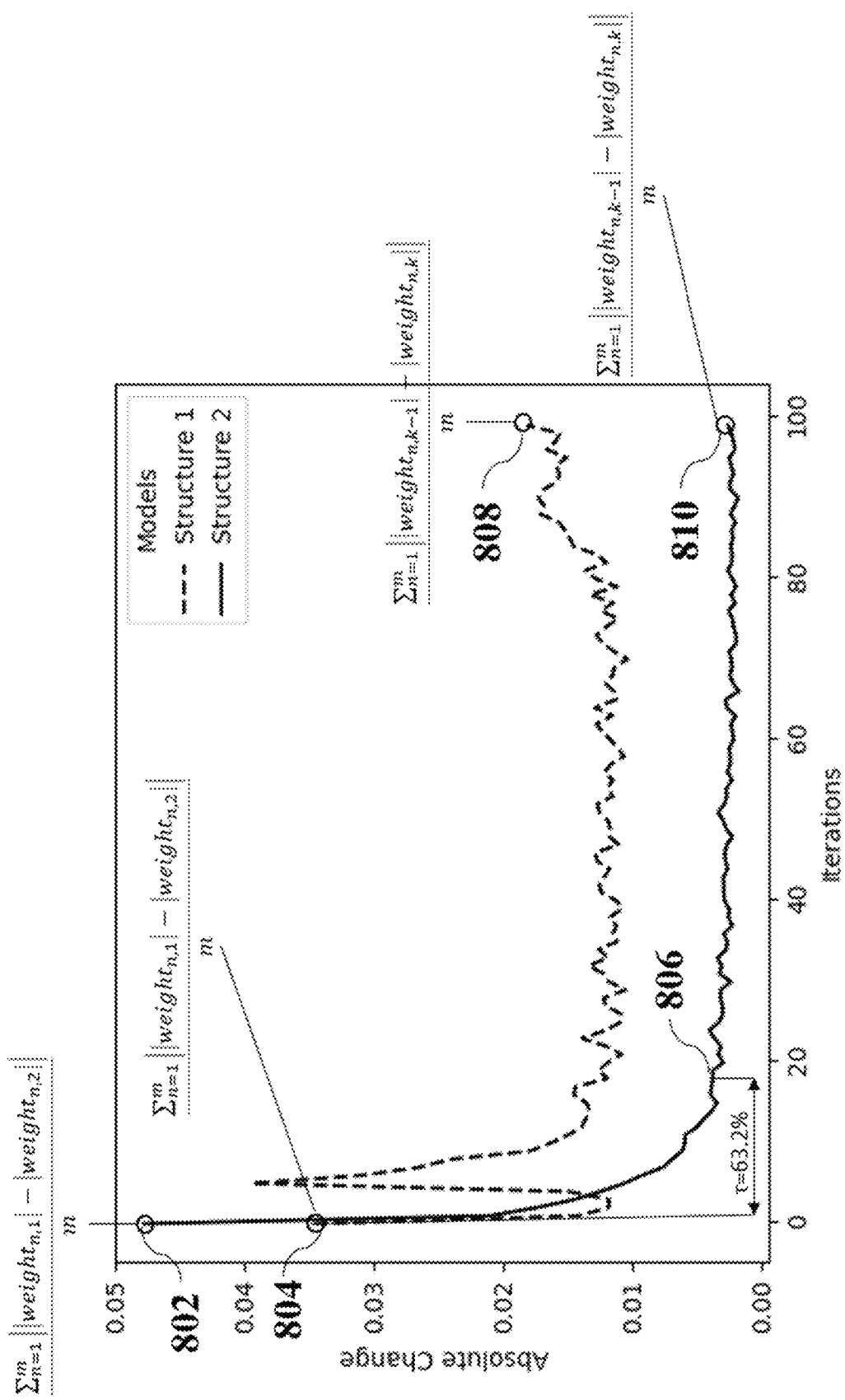
FIG. 8 shows an example of the Efficient Compute Frontier (ECF) factor calculation for two models based on absolute weights change between training iterations.

FIG. 8 is one example how convergence works for two different structures, where points on these curves are used to calculate the ECF factor. FIG. 8 demonstrates two different training processes for two model structures: Structure 1 starting with point 802 and finishing with point 810, and structure 2 starting with point 804 and finishing with point 808.

Various methods may be used to determine which candidate-domain specific AI models have the highest fitness. For example, the fitness function may be used as basis for three methods: evolutionary genetic algorithm, reinforcement learning, and random forest model to evaluate a broad range of model architectures.

The genetic algorithm-based setup operates through a series of evolutionary steps: it begins by generating a diverse initial population of random neural network architectures, evaluates their fitness after training, and selects the best candidates for reproduction through crossover. This process creates a new population, which then undergoes random mutations to preserve diversity. The old population is replaced with the new one, and these steps are repeated iteratively until no further improvement in fitness is observed over several cycles. The architecture with the highest fitness is ultimately selected as the final output.

A Random Forest-based starts with generating and training an initial random population, followed by extracting structural and statistical features from each architecture. A random forest model is trained on these features and their corresponding fitness scores to act as a predictor. New candidate architectures are then generated and their fitness predicted using the surrogate; the most promising ones are selected for actual training and evaluation. These results are used to update the surrogate model iteratively. The cycle continues until no significant fitness improvement is observed, at which point the best-performing architecture is returned.

The Reinforcement Learning-based method employs an LSTM controller to generate candidate neural network architectures as variable-length sequences, where each architecture's structure is sampled from learned probability distributions over layer counts and neuron counts per layer. The controller receives a dummy input and outputs these distributions through softmax-activated heads. Generated architectures are trained and evaluated, with their fitness scores serving as rewards to guide the controller's learning via policy gradient optimization. The loss function is computed from the log-probabilities of sampled architectural choices, weighted by their fitness rewards, and used to update the controller's parameters through gradient descent. This iterative process continues until no further improvement is observed in the average reward, at which point the best-performing architecture (e.g., the optimized domain-specific AI model) is returned.

This process is shown in more detail in FIG. 2.2. See, for example, NLP/LLM engine 114 (with respective blocks 222, 224, 152, 226 and 228).

Figure 10:
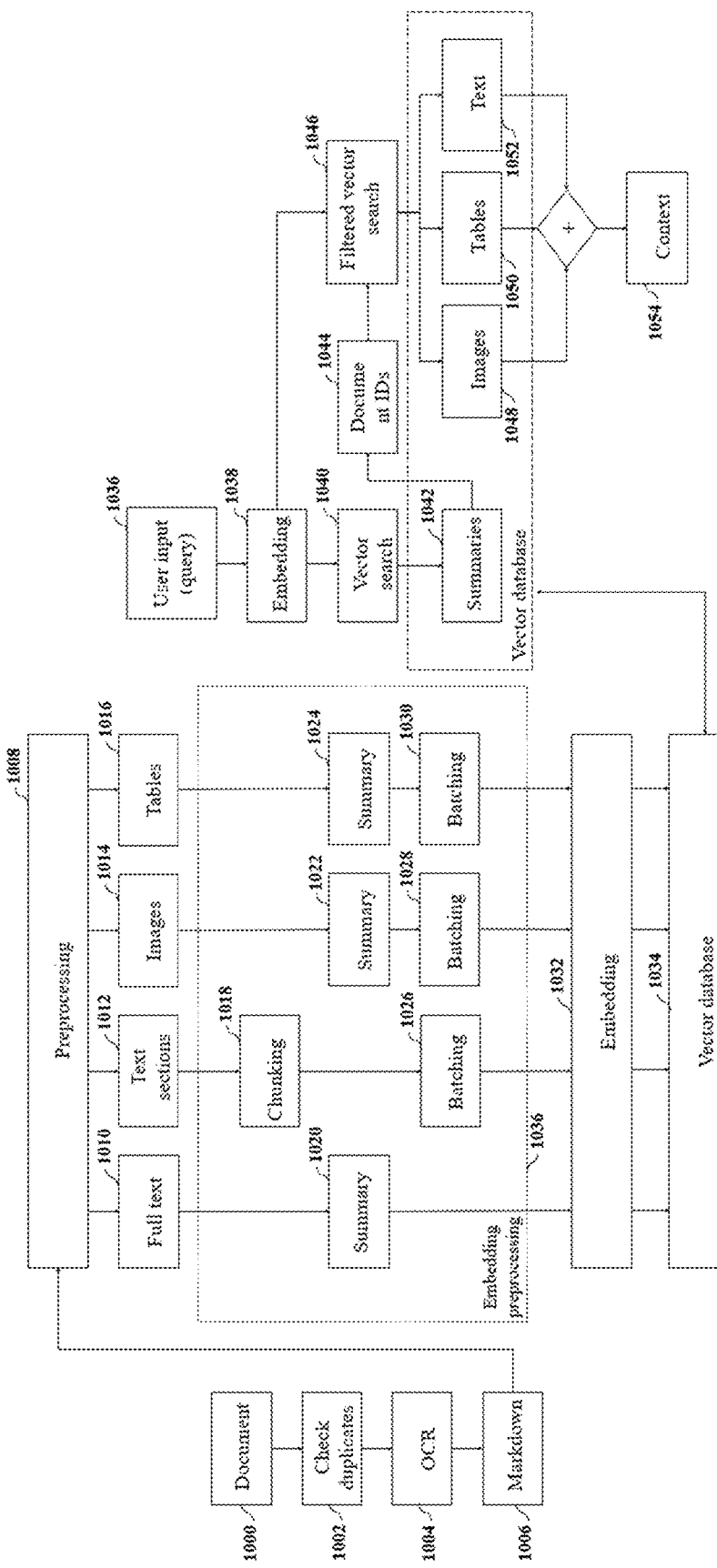
FIG. 10 shows how text-based training data may be scanned and added to an LLM's RAG pipeline.

As shown in FIG. 10, in some embodiments, the method and process pertains to a multimodal advanced Retrieval-Augmented Generation (RAG) system configured to process, embed, retrieve, and generate natural language outputs based on heterogeneous components/inputs. The method comprises a pipeline for data acquisition, multimodal pre-processing, semantic embedding, document retrieval, and response generation.

Although the invention will often be configured to process new sets of training data in response to a given query, in some embodiments, the invention will be configured to store reference sets of training data in its knowledge base, and to pick and choose some of these reference sets of training data for further processing and further "self-training" in response to a new task comprising either these new "task" sets of training data, or new "task" output type election, new "task" knowledge domain election, or new "task" query data.

Here, for example, the system can maintain a record of the domain status of its presently implemented AI models, as well as a record of the available knowledge domains represented by the reference sets of training data in its knowledge base. The system may further employ an optional training AI (such as a training LLM) configured to identify knowledge domain gaps between any of the new "task" sets of training data, or new output type election, new knowledge domain election, or new query data. The training LLM can then determine if any reference sets of training data in the knowledge match or at least correlate with these knowledge domain gaps. If the training LLM identifies suitable reference sets of training data, the system can be configured to automatically select and self train on at least some of the relevant sets of training data in order to better configure the system to tackle the latest task.

For example, in some embodiments, said knowledge base may further comprise a plurality of additional training data. Here, the invention may further use a training AI model to determine knowledge domain gaps between any of a new task's training data, output type election, knowledge domain election, or query data. The invention may further be configured to use this training AI model to automatically select this additional training data, and use this additional training data to produce additional optimized domain-specific AI models in response to new tasks (e.g. in response to any new "task" training data, output type election, knowledge domain election, or query data.)

In some embodiments, a corpus of documents 1000 (e.g., training data) that may be input by the user or already part of the knowledge base may be curated via manual or web scraping methods. To avoid inadvertently training on multiple sets of the same document, in some embodiments, each training document may be deduplicated 1002 via a cryptographic hash check and subsequently passed through an Optical Character Recognition (OCR) module 1004 (e.g. Mistral OCR). The training document is parsed into a structured markdown format 1006 containing full text 1010, sectional headers 1012, tables 1016, and images 1014 as preprocessing starts 1008.

Subcomponents of the training document may be segmented using summarization 1020, 1022, 1024, semantic chunking via token windowing 1018, and batch processing 1026, 1028, 1030. Images and tables are independently extracted and semantically enriched using visual-language models, such as Gemini 1.5 Pro for images and LLAMA 4 Scout for tabular data. Each content item is annotated with metadata, including position, section headers, and document identifiers.

Each training document content element—text chunk, image description, and table summary—is transformed into a high-dimensional vector representation using a sentence-transformer model, specifically all-mpnet-base-v2. The embeddings 1032 are stored in a vector database 1034 such as Weaviate, which supports optimized k-Nearest Neighbor (k-NN) similarity search, metadata filtering, and persistent indexing using unique document identifiers. At runtime, the system encodes the user's natural language query 1036 into an embedding vector 1038 and matches it 1040 against a summary-level vector index 1042 to identify relevant documents 1044. A second-pass retrieval 1046 extracts text chunks 1052, image captions 1048, and table summaries 1050 from the top-ranked documents. This hierarchical retrieval process enhances contextual relevance 1054 and retrieval precision while maintaining traceability.

For example, in some embodiments, such as when the fused compacted cleaned training data is used to iteratively train a candidate domain-specific AI model that uses a Retrieval-Augmented Generation (RAG) LLM, RAG methods have a chunk limit. Here when the training data has a memory size less than a preset RAG chunk limit, then the system may use any of at least one processor and at least one machine learning engine to handle the training data in one pass. Otherwise, the system may automatically break at least some of the fused compacted cleaned training data into multiple chunks, and to handle the multiple chunks using a pretrained embedding model.

Here, in some embodiments, the system may further use an inference engine comprising any of a natural language processor (NLP), large language model (LLM), and the shared knowledge base, to determine any of this preset chunk limit, and/or determine this pretrained embedding mode.

The retrieved content is compiled into a structured prompt tailored to the modality of the original user query. Different prompt formats are applied depending on whether the context is textual, tabular, or visual. The structured prompt is then passed to a large language model (LLM) for response generation, resulting in natural language answers grounded in multimodal content. The system thereby enables high-accuracy, explainable question answering for use in clinical support, biomedical research, and domain-specific knowledge synthesis.

This same type of procedure may also be used in the following engines: inference engine 142 (with respective blocks 238, 150, 244, 240 and 242), decision engine 158 (with respective blocks 246, 164, 252, 248 and 250), web scraping engine 174 (with respective blocks 176, 178, 180, 292, 294, 296 and 298) and learning engine 160 (with respective blocks 286, 166, 290, 292 and 288). Results from each engine can be returned to the user if they want to use only one or a limited number of engines; alternatively, they can be passed over sequentially to the next required engine to complete the end-to-end procedure.

All samples and metadata about models/methods performance from each engine may be stored in the platform's knowledge base 284 (or 172) via steps 280, 282, 270, 272, 274, 276, 278 and 299. This knowledge base may be used by the learning engine 160 that processes the data and returns results back to the knowledge base 284. Over time, the learning engine can be configured to optimize the operation of all platform engines by automatically providing guidance on which models/methods to use or avoid for specific datasets.

Note that in some embodiments, the invention may use an LLM to determine which optimized domain-specific AI models, from either that session's newly generated optimized domain-specific AI models, or previously stored optimized domain-specific AI models, to use to automatically generate the output results.

Note that in these figures, the central block of each "step" or engine is also called the "agent".

Figure 3:
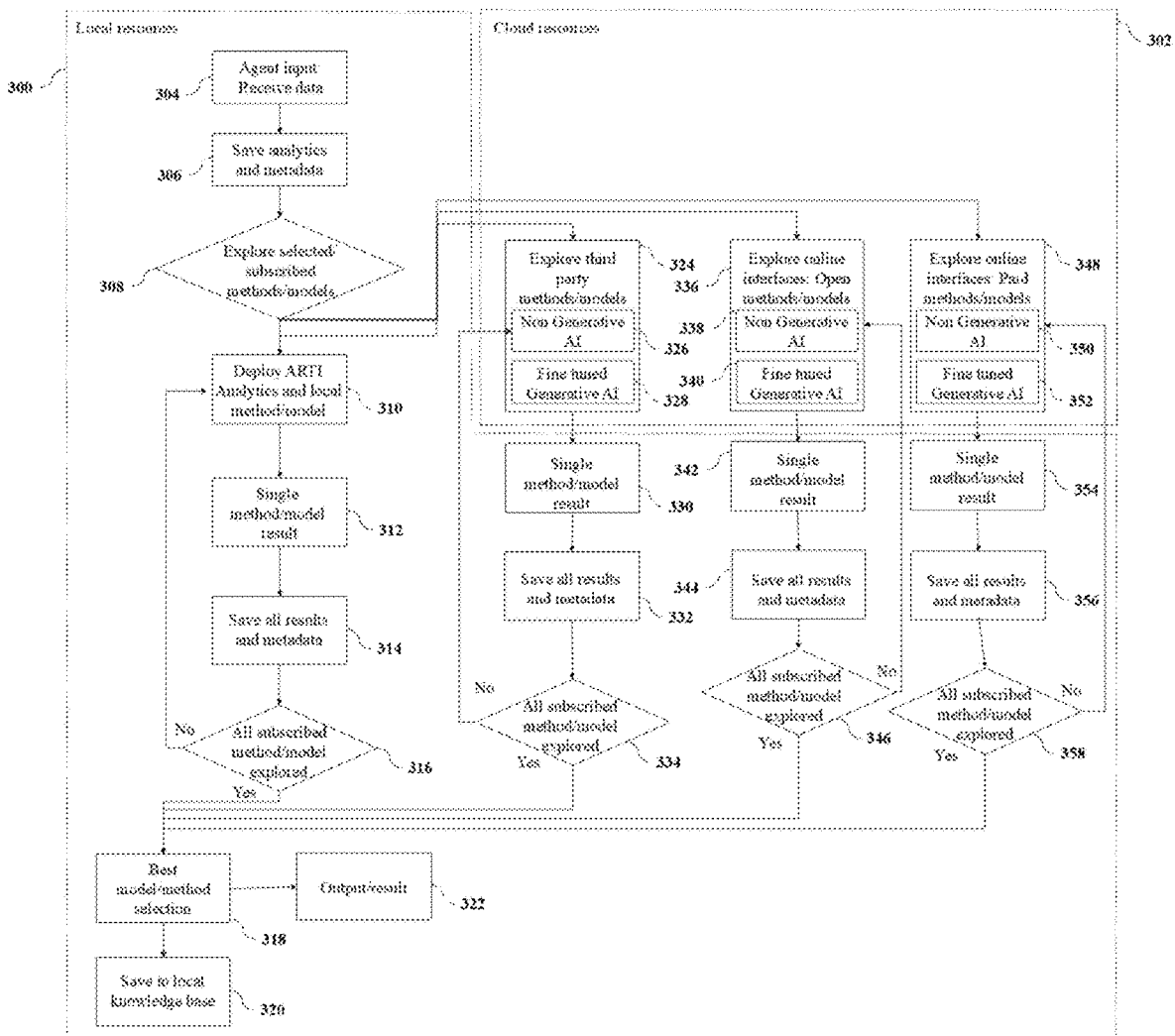
FIG. 3. is a block diagram of some of the data preparation, data reduction, data fusion, inference, NLP/LLM, decision and learning processes in accordance with the present invention.
Figure 4:
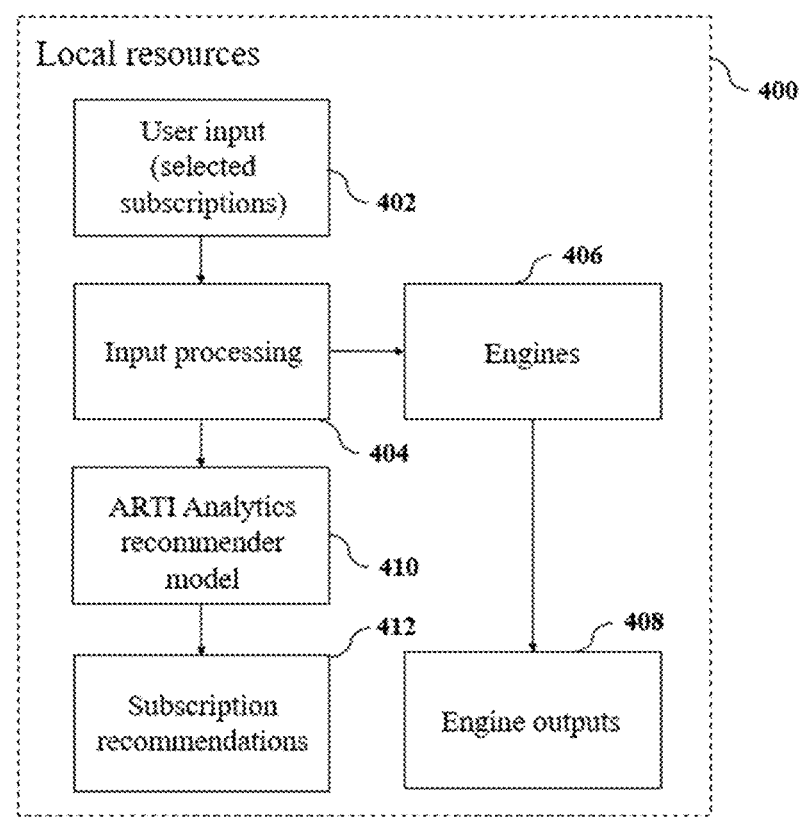
FIG. 4. is a block diagram of the agent structure for the optional user interface in accordance with the present invention.

FIG. 3 shows a block diagram of the agent structure for data preparation, data reduction, data fusion, inference, NLP/LLM, decision, and learning agents in accordance with the present invention. Agents in this group share a similar structure, but the models/methods they use vary across different agents. Once the agent receives the training dataset 304, it stores the analytics and metadata 306 for that dataset and starts to explore the model/methods space 308 and its hyperparameters. Each agent explores four groups of models/methods: previously derived custom analytics methods/models 310 including local third-party models, third-party methods/models hosted online on a platform server (e.g. ML.NET, Tensorflow, SKLearn, Keras, NumPy, Pandas, XGBoost) 324 including non-generative AI 326 and fine-tuned generative AI models 328, open access methods/models accessed through online interfaces hosted by third parties 336 including non-generative AI 338 and fine-tuned generative AI models 340, and paid methods/models accessed through online interfaces hosted by third parties 348 including non-generative AI 350 and fine-tuned generative AI models 352. After exploring the methods/models' space in each group, the agent returns a single best result from each group (312, 330, 342 and 354), saves it (314, 332, 344 and 356) and selects the globally best model/method 318 if the method/model space is explored. If not, respective steps 316, 334, 346 and 358 iterate the procedure until all methods/models are explored. This result is stored in the local database 320 and forwarded as output/result for further action 322. Each engine has access to local 300 and cloud resources 302 to optimize the speed and responsiveness of the platform. One example of LLMs are pre-trained foundation models such as:

Llama-4-Scout-17B-16E-Instruct by Meta.
Llama-4-Maverick-17B-128E-Instruct-FP8 by Meta.
DeepSeek-Prover-V2-671B by DeepSeek AI
DeepSeek-R1 by DeepSeek AI
DeepSeek-R1-Turbo by DeepSeek AI
Qwen3-235B-A22B by Qwen
Qwen3-30B-A3B by Qwen
Qwen3-32B by Qwen
Qwen3-14B by Qwen
llama-3.3-70b-versatile by Meta llama-3.1-8b-instant by Meta
gemma2-9b-it by Google
Mistral Large 2 (123B) by Mistral AI.
Mistral Medium 3 by Mistral AI.
Mixtral 8×22B by Mistral AI
Mixtral 8×7B by Mistral AI
GPT-4.1 by OpenAI
GPT-4.5 by OpenAI
GPT-4o by OpenAI
o1 by OpenAI
o3 by OpenAI FIG. 4 presents a block diagram of the agent structure for one type of user interface agent 400 in accordance with the present invention. Since this particular agent deals with subscription recommendations, it uses user inputs 402 (e.g., selected subscriptions), orchestrates the data 404 and transactions between engines 406 and their outputs 408, and analyses the inputs to train the recommender model 410 and generate recommendations 412.

Figure 5:
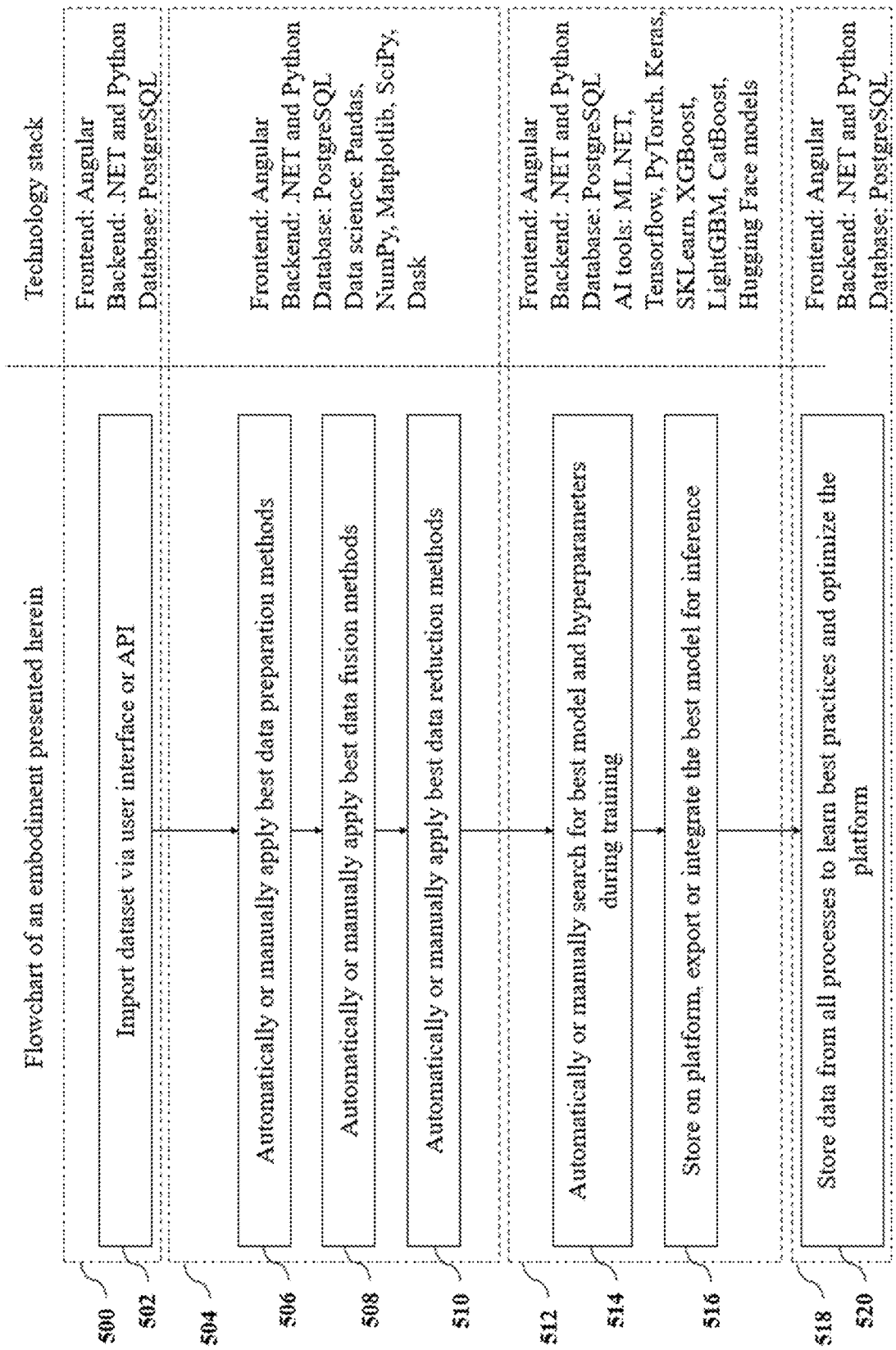
FIG. 5. is an example of a method application for one model-building procedure in accordance with the present invention.

FIG. 5 presents an example of a method application for one end-to-end no-code artificial intelligence model-building procedure in accordance with the present invention. The example includes a use case where the user imports datasets 502, receives automatic recommendations on how to prepare the dataset (e.g., remove outliers, impute data, normalize data) that can be automatically applied 506, receives automatic recommendations on how to fuse data 508 (e.g., soft-hard data fusion) that can be automatically applied and receives automatic recommendations how to reduce data 510 (e.g., principal component analysis, clustering, singular value decomposition). Once the data is pre-processed with best built-in practices, the model training starts where training engines explores/searches 514 all integrated libraries for model training and all hyperparameters (e.g. ML.NET, Tensorflow, PyTorch, Keras, SKLearn, XGBoost, LightGBM, CatBoost, Hugging Face transformer models). The best model for a specific dataset in the use case is, after that, stored on the platform and available for export or integration with third-party systems for inference 516. During this whole end-to-end process, all steps with metadata may be recorded in a learning engine that learns best practices 520 and what works for specific use cases and optimizes the platform operation.

In a preferred embodiment, the whole process does not include coding, only user-friendly guidance through the user interface, enabling non-domain experts to use artificial intelligence without data science or artificial intelligence knowledge. The example technology stack used to build the software architecture is show in right side under blocks 500 (UI agent), 504 (data preparation, fusion and reduction agents), 512 (training, inference, NLP/LLM and decision agents) and 518 (learning agent).

Figure 6:
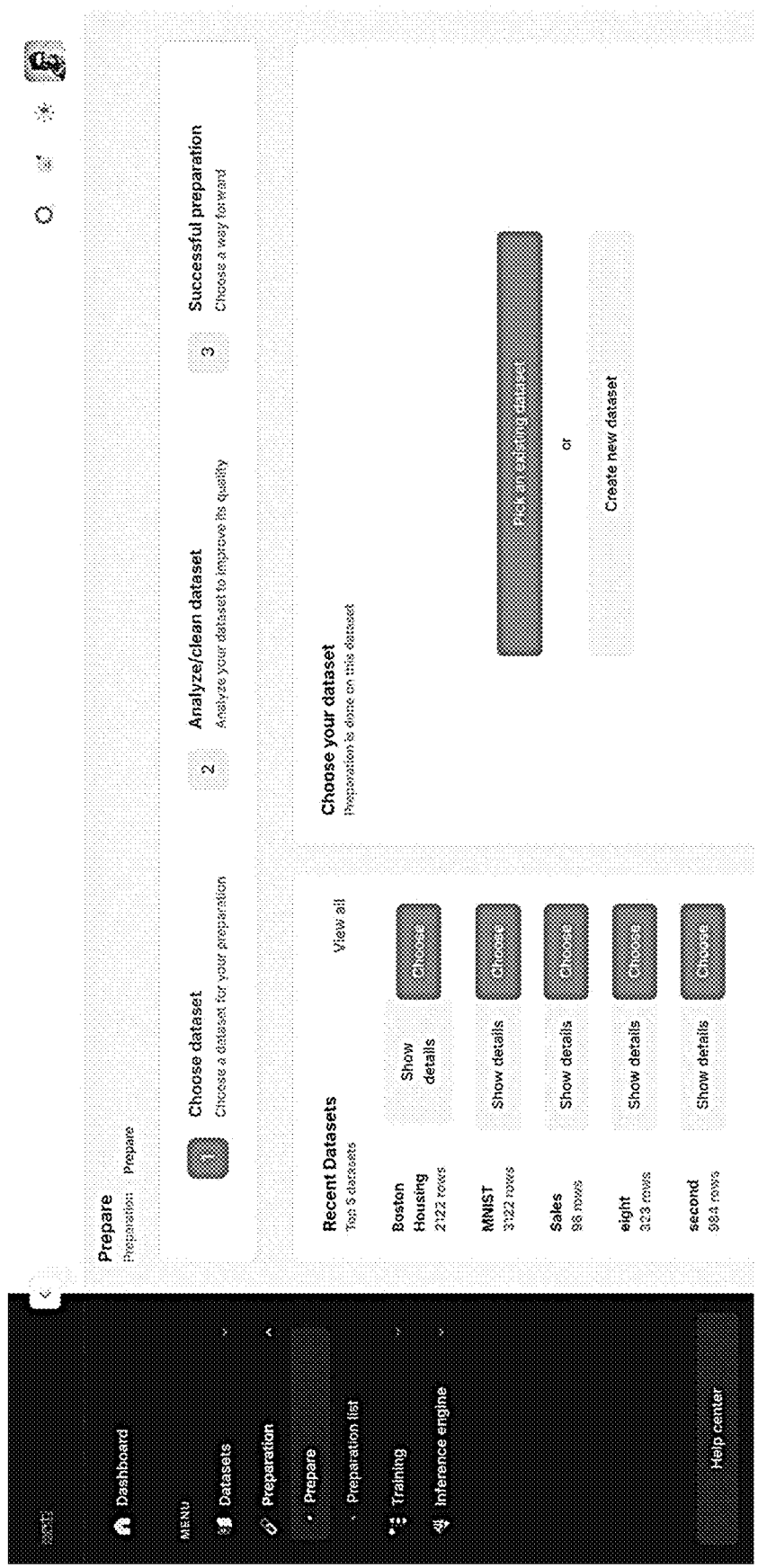
FIG. 6. is an example of an optional user interface dashboard in the data preparation step where the user can optionally manage some or all of the uploaded and cleaned datasets.

FIG. 6 shows an example of an optional user interface dashboard in the data preparation step where the user can observe and optionally manage some or all of the all uploaded and cleaned datasets.

Figure 7:
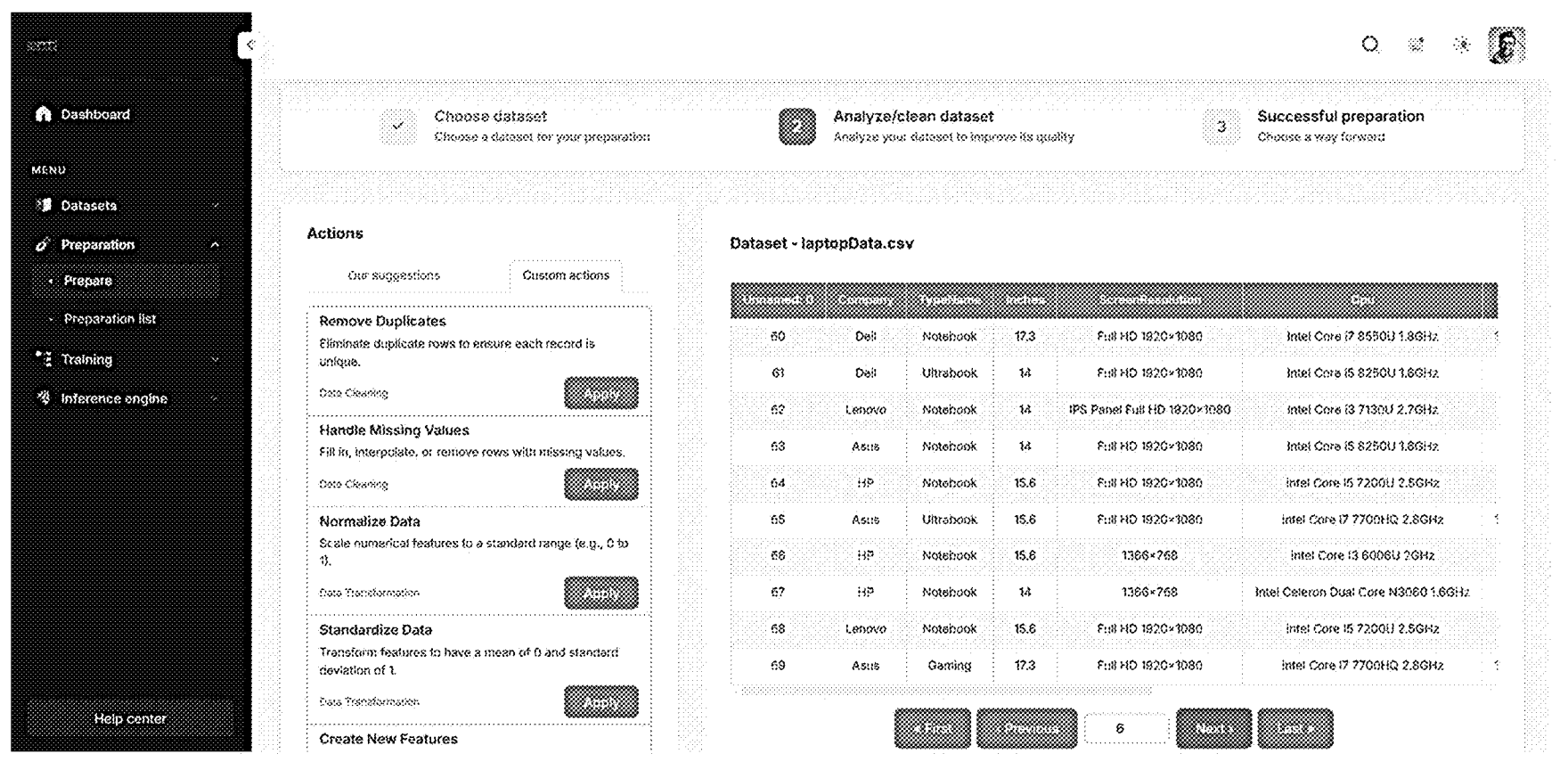

FIG. 7 shows an example of a user interface dashboard in the data preparation step where the user optionally receives automatic recommendations from the agent, and then chooses whether to apply them or to intervene in the suggested methods manually.

In some embodiments, to enable parallelization, the platform may optionally organize some or all of its functional parts (engines) into small, self-contained software services/microservices. Here, every service may publish a short "profile" that lists the type of computer power it needs (for example, whether it prefers a graphics card, how much memory it consumes, and whether it must respond in real time). A central coordinating layer (gateway) reads those profiles, watches how busy each service is, and then places the work on whatever computers are free at that moment. This matching process is automatic, continuous, and requires no action from the user; as a result, heavy jobs move to powerful machines while lighter jobs stay on less powerful devices. All useful information may be stored in a learning agent and the knowledge base as the platform learns from experience.

When raw training data arrive, the coordinating layer first measures how large and complex they are. If the training data are modest, they are handled in a single pass. If they are large, the data are cut into sensible portions ("chunks"). Each chunk then travels through the same three-step path including cleaning, transformation, and size-reduction but many chunks can move down that path side by side. Because the chunk size is written in an editable settings file, an operator can raise or lower it without changing any underlying code, making it easy to balance speed against memory use.

In some embodiments, the inference engine may follow an approach where the platform keeps a shelf of proven ways to spread a task across more than one processor: splitting the data, splitting the model, breaking long calculations into stages, or even sharing the work across several ordinary computers. Before training starts, the platform selects the simplest spreading method that will finish the job in a reasonable time. After a model is ready, the same framework governs day-to-day predictions. Small, quick requests are answered one by one to keep response times low. Bulk jobs (for example, an entire dataset sent for inference) are gathered into groups and processed together. If a model grows too large for any single computer, the framework quietly splits the model so that different parts run in parallel, then reunites the answers before returning the result.

Because every choice such as chunk size, spreading method, response style may be configured to be part of the platform knowledge base and the learning agent, the platform may also be configured to operate in a no-code mode. This combination of automatic matching, adjustable rules, and parallel job handling delivers an end-to-end artificial-intelligence workflow that is powerful, flexible, and suitable for different scales of data processing.

Regarding the Data Preparation and Reduction Engine operations-namely cleaning, transformation, and reduction. In some embodiments, these may be regarded as interdependent; accordingly, in a preferred embodiment these operations may be executed in a prescribed sequence in which cleaning is performed first, transformation is carried out second, and reduction is executed last. A principal design consideration is the manner in which the incoming data set is divided into manageable chunks. Advantageously, the chunk size is rendered configurable, thereby permitting flexible adjustment without alteration of source code. A threshold defining the chunk size is stored in a configuration file so that the configurable chunk size not only affords operational flexibility but also facilitates testing and tuning during development and production. If the data-set size is less than or equal to the defined chunk size, the data set is processed sequentially. If the data-set size exceeds the defined chunk size, the data set is partitioned into chunks and the chunks are processed in parallel.

Two approaches to parallelism are contemplated:
Pipeline parallelism per chunk: Each chunk is conveyed through all stages-cleaning, transformation, and reduction-independently before a subsequent chunk is admitted.
Sequential stage parallelism across the entire data set: All chunks are processed for a first stage (cleaning), recombined into the full data set, and the full data set is then processed for the next stage (transformation), with subsequent stages applied in like manner.

During training, several forms of parallelism may be applied during model-training operations. The principal approaches include:
Data Parallelism: employed when a large data set is partitioned across multiple GPUs or CPUs.
Model Parallelism: employed when a model is too large to reside entirely on a single device.
Pipeline Parallelism: employed when computations associated with very deep models are divided into sequential stages.
Distributed Training: employed when extremely large data sets or models necessitate the use of more than one machine.

To accommodate diverse model types and training requirements, it is advantageous that one or more of the foregoing parallelism strategies be rendered configurable. By so doing, the overall system is made both flexible and scalable while the underlying code base is kept clean and maintainable. During execution, the data-set size is dynamically examined, and an appropriate parallelism strategy is selected in accordance with the stored configuration parameters. Accordingly, each of the listed parallelization methods is implemented so that superior training performance is achieved. Because the configuration may be altered with minimal effort, the chosen parallelism strategy can be fine-tuned during testing or adjusted in response to server-resource availability In a manner analogous to the training engine, multiple forms of parallelism may be employed within the inference engine. The principal approaches include:
Request-Level Parallelism: multiple concurrent inference requests are handled simultaneously.
Batch Inference: large input training sets are grouped into batches and processed in parallel.
Model and Pipeline Parallelism: models whose size exceeds the capacity of a single device are partitioned across multiple devices (by layers or segments).
Distributed Inference: inference workloads are spread across several machines so that high-volume or geographically dispersed applications are accommodated.

In certain embodiments, the foregoing parallelism techniques are selected in dependence upon data-set size or specific use case, and the selection parameters are rendered configurable. Although the inclusion of such configurability entails additional implementation effort, a resulting inference engine is obtained that remains flexible and scalable while dynamically adapting to varying workloads and operating environments.

Consistent with the methodology applied to the training and inference engines, multiple forms of parallelism may be utilized within the NLP/LLM engine. The principal forms include:
Data Parallelism: large data sets are partitioned across multiple GPUs or CPUs so that processing is performed more rapidly.
Model Parallelism: large language models that exceed the memory capacity of a single device are divided among several devices.
Pipeline Parallelism: very deep transformer models are segmented into successive stages, and the segments are executed concurrently on different devices.
Distributed Inference/Training: training or inference workloads are propagated across multiple machines, thereby enabling operation over large data sets and models that must be processed in parallel on several nodes.

The particular parallelism technique is selected in dependence upon data-set size and model size, and the selection parameters are rendered configurable. Although the provision of such configurability entails additional initial effort, a flexible and scalable NLP/LLM engine is thereby obtained that can accommodate a wide range of workload conditions.

The Decision Engine is configured to facilitate machine-human decision-making. Several forms of parallelism may be advantageously employed, including:
Task Parallelism: where multiple decision-related tasks—such as data acquisition, algorithm execution, and recommendation generation—are executed concurrently, thereby reducing overall decision latency.
Request-Level Parallelism: where multiple decision requests received simultaneously are processed in parallel, ensuring high throughput without system slowdown.
Pipeline Parallelism: where a multi-stage decision workflow (e.g., data analysis→prediction→recommendation) is partitioned across separate computational units so that each stage executes concurrently on distinct hardware resources.
Model Parallelism: where large predictive or optimization models are partitioned across multiple devices so that extensive computations are handled efficiently.
Distributed Decision Processing: where decision workloads involving large data sets or complex algorithms are distributed across several machines, each machine processing a portion of the decision flow, thereby providing scalability for high-volume or complex scenarios.

It is advantageous that the foregoing parallelism modes be rendered configurable in accordance with the decision-making workload. Although the implementation of multiple modes entails additional effort, a resulting Decision Engine is obtained that remains flexible and scalable while adapting to varying complexity levels, request volumes, and resource availability.

The Learning Engine is configured to perform both short-term and long-term learning. Its operating efficiency may be enhanced through several parallelism strategies, described as follows:
Data Parallelism: large data sets are split across multiple GPUs or CPUs so that the data can be processed concurrently, whereby learning speed is increased.
Model Parallelism: models that grow large or complex over time are partitioned across multiple devices so that training or updating is completed without overloading any single GPU or CPU.
Task Parallelism: independent tasks—such as data ingestion, model training, evaluation, and feedback—are executed simultaneously, thereby shortening the time required for system adaptation.
Pipeline Parallelism: successive stages of the learning workflow (e.g., feature extraction, model training, evaluation) are assigned to different hardware resources and are executed in parallel, thereby optimizing throughput.

Distributed Training: the training process is divided across multiple machines when both the data set and the model are too large to be accommodated by a single machine, whereby faster and more efficient learning is achieved.

All these types of parallelism can be based on the learning task and dataset size, and making the parallelism configurable. By adjusting parallelism strategies dynamically, the Learning Engine can support various short- and long-term learning scenarios while remaining flexible and scalable. Although this requires additional setup and configuration, the end result will be an adaptable system that can handle different workloads efficiently.

With respect to security, in a preferred embodiment the various engines and their corresponding microservices are implemented in a secure manner so that data are not leaked into cyberspace. Security is regarded as essential, and robust protective measures are applied to safeguard data and regulate access.

In such preferred embodiments, all or substantially all data are retained within the system, thereby preventing external large-language models (LLMs) or third parties from accessing or re-using sensitive information and thereby preserving data privacy and integrity. A dedicated authentication server is provided so that only authorized users within the organization are permitted to reach the system's endpoints and microservices. A user-management service is further provisioned to administer user roles, permissions, and access controls; consequently, user data are handled securely, and interaction with the system is permitted solely by legitimate users, thereby reducing the likelihood that unauthorized parties can reach or influence the services.

A unified logging-and-monitoring facility is preferably deployed to record activity and observe security conditions across disparate cloud environments, whereby comprehensive visibility of system operations is maintained and potential issues can be detected promptly.

Various engines and their corresponding microservices are capable of being executed either in parallel or at different times-individually or collectively-on a variety of servers and cloud services so that operational flexibility and reliability are provided. In a preferred embodiment, the system is configured to be fully cloud-agnostic, whereby deployment across multiple cloud platforms is enabled for maximum flexibility. Regardless of the cloud provider, the system is adapted to operate in diverse environments without necessitating significant modification. By virtue of this multi-cloud capability, vendor lock-in is avoided, and the respective strengths of each platform are leveraged. Consequently, performance, cost, and availability are optimized, and the system is permitted to scale and adapt to a variety of workloads and business requirements, irrespective of the chosen cloud infrastructure.

In some embodiments, scalability of the platform may be achieved through using its microservice-based architecture and engine-oriented implementation. In certain embodiments the system is designed with scalability as a principal objective so that larger workloads are accommodated efficiently. A microservices architecture is employed, thereby permitting each component—namely the Data Engine, Training Engine, Inference Engine, and NLP/LLM Engine—to be scaled independently. By virtue of this modular arrangement, additional resources are allocated or tasks are parallelized for individual services without affecting the remainder of the system. Horizontal scaling is implemented by introducing additional service instances, while vertical scaling is implemented by assigning more capable hardware (for example, GPUs for the Training Engine). Accordingly, the platform is enabled to adapt seamlessly to increasing data volumes and processing demands. A service mesh is preferably implemented to optimize communication among microservices, thereby improving performance and reliability in multi-cloud deployments.

Figure 9:
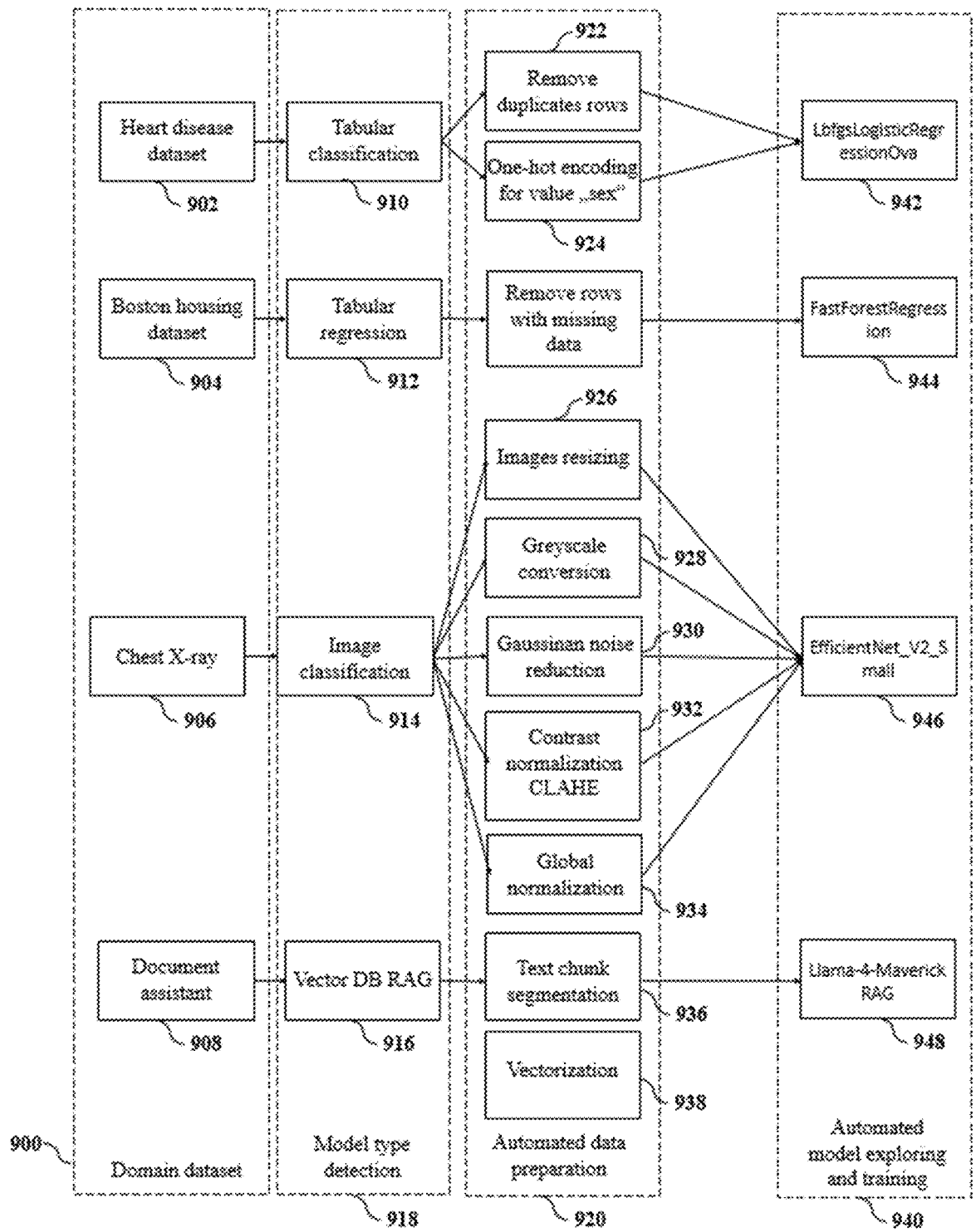
FIG. 9 shows examples of how the invention can operate with various knowledge domains and types of training data.

FIG. 9 shows examples of how the invention can operate with various knowledge domains and types of training data.

Here, four examples of using the system with datasets that will produce candidates ready to be used with query data explained in the following text.

Example 1. Classification Dataset-Heart Disease

The Heart Disease dataset 902 commonly used for classification tasks on Kaggle.com (*Heart Disease UCI* by Dheeraj) includes 14 attributes related to patient health metrics, such as age, resting blood pressure, cholesterol levels, maximum heart rate achieved, and ST depression induced by exercise, along with a target variable indicating the presence or absence of heart disease. It contains around 303 entries and features both continuous and categorical variables, including "sex" with two values representing male and female. It has been widely used to benchmark classification models 910 and explore the impact of various preprocessing strategies like encoding, normalization, and outlier removal.

Upon analyzing the heart disease dataset through the data preparation engine, several preprocessing insights were obtained. The most immediate finding is the presence of duplicate records, which can lead to biased model training and inaccurate statistical analysis. As such, the first transformation step will be to remove all duplicate rows 922, ensuring each data point is unique and accurately contributes to the learning process.

The dataset includes a single categorical column, "sex", which contains two unique values and represents a nominal variable without inherent order. Given this, and considering that machine learning models such as linear regression, neural networks, or even some tree-based models benefit from explicit numerical representations of categorical inputs, the system will apply One-Hot Encoding 924 to this feature. One-Hot Encoding is the preferred method for nominal variables because it avoids implying any ordinal relationship between categories, thus preserving data integrity. Since "sex" has low cardinality (only two categories), the risk of dimensionality explosion is minimal, making One-Hot Encoding both appropriate and efficient in this context.

Beyond these steps, no other preprocessing actions are required. The dataset contains no missing values, eliminating the need for imputation or row removal. Furthermore, no outliers were detected, so no adjustment or filtering is necessary. The dataset also does not require normalization, indicating that feature values are already appropriately scaled for modeling.

Finally, no dimensionality reduction techniques are recommended, suggesting the dataset's existing structure is well-suited for analysis.

Following preprocessing, the heart disease dataset was fed into the training engine, which is designed to efficiently explore a wide range of machine learning algorithms in parallel. This automated model selection process enables comprehensive experimentation by evaluating various model types, hyperparameter configurations, and training strategies concurrently.

Among the numerous models evaluated, including decision trees, support vector machines, ensemble methods, and neural networks, the best-performing model was LbfgsLogisticRegressionOva 942. This model uses the Limited-memory Broyden-Fletcher-Goldfarb-Shanno (LBFGS) optimization algorithm-a quasi-Newton method well-suited for convex problems and scalable to large datasets.

It recorded a MicroAccuracy of 0.84, indicating that the model correctly predicted 84% of all samples when considering the total number of individual predictions made. Its MacroAccuracy of 0.845 reflects a balanced performance across all classes, even in the presence of class imbalance. The LogLoss score of 0.454 demonstrates that the model's probability estimates are well-calibrated and confident, while the LogLossReduction of 0.344 highlights a significant improvement over random guessing.

Example 2. Regression Dataset-Boston Housing

The Boston Housing dataset 904, available on Kaggle.com (e.g., Boston Housing Data by Ziyad), is a classic regression dataset that consists of 506 rows and 14 columns. It includes features such as the average number of rooms per dwelling ("rm"), per capita crime rate, proportion of non-retail business acres per town, and more, with the target variable being the median value of owner-occupied homes in $1000s. The data originates from the U.S. Census and is often used to evaluate regression models 912 due to its mix of continuous and derived numerical variables. It's a standard benchmark for regression tasks using models like linear regression, random forests, or gradient boosting.

Upon analyzing the Boston Housing dataset through the data preparation engine, several key findings were identified. First and foremost, the dataset does not contain any duplicate entries, which indicates that each observation is unique and there is no redundancy that could bias the model training. Additionally, the engine flagged one column—"rm"—as containing a small percentage of missing values, specifically 0.9881%. According to the system's data cleaning policy, when less than 5% of a column's values are missing, the appropriate approach is to remove the rows containing the missing values rather than attempt imputation or drop the column entirely. Therefore, the only transformation needed in this case is to drop those few rows where "rm" is missing 950, preserving the rest of the column and the valuable information it provides.

Beyond this, no further preprocessing steps are required. The dataset contains no categorical columns, meaning that encoding methods like one-hot or label encoding are unnecessary. Furthermore, no outliers were detected. The dataset also does not exhibit any issues that would require normalization, such as wide-ranging feature scales that might affect distance-based algorithms. Finally, no recommendation for dimensionality reduction was made, implying that the dataset's feature space is appropriately sized for modeling without the need to apply PCA or similar methods.

After preprocessing, the Boston Housing dataset was passed through the training engine, which automatically evaluates a diverse range of regression models in parallel.

Among the models tested—including linear regression, boosted trees, and neural networks—the model that achieved the best performance was FastForestRegression 944. This algorithm is an implementation of an ensemble learning technique based on decision forests, combining multiple regression trees to produce a more accurate and stable prediction. By aggregating the outputs of many weak learners, FastForestRegression mitigates overfitting and captures complex, nonlinear relationships between features and the target variable.

The performance of this model was evaluated using several key regression metrics. The R-squared ($R^2$) score was 0.793, indicating that approximately 79.3% of the variance in housing prices could be explained by the model's predictions. This suggests a strong correlation between the input features and the predicted output. The Mean Squared Error (MSE) was 16.02, representing the average of the squared differences between the predicted and actual values. Similarly, the Root Mean Squared Error (RMSE)—which makes the error metric more interpretable in terms of the target variable's original scale—was 4.003. Lastly, the model achieved a Mean Absolute Error (MAE) of 2.753, reflecting the average magnitude of prediction errors regardless of direction.

Example 3. Computer Vision Dataset-Chest X-ray

The Chest X-ray dataset 906 frequently used on Kaggle.com (e.g., Chest X-Ray Images (Pneumonia) by Paul Mooney) includes over 5,000 grayscale chest X-ray images categorized into "PNEUMONIA" and "NORMAL" classes. It is a widely cited medical imaging dataset designed for binary classification 914 tasks in the healthcare domain. It is used in various computer vision tasks focusing on disease detection from medical imaging data.

In preparing the image data for a computer vision task on the Chest X-ray dataset, a structured sequence of preprocessing steps was applied to enhance input quality and ensure model compatibility.

The process began with resizing all images to a fixed resolution of 224×224 pixels 926, a standard input size for many convolutional neural networks. This resizing ensures uniformity across the dataset and allows batch processing during training and inference.

Next, the images were converted to grayscale, reducing each image from three color channels (RGB) to a single channel 928. This transformation is particularly effective when color is not a primary feature for classification or detection, thereby reducing input complexity and focusing the model's attention on structural features like edges, textures, and shapes.

To further enhance image clarity, Gaussian noise reduction was applied 930. This technique smooths out random variations in pixel intensity without significantly blurring key features, improving the signal-to-noise ratio and ensuring that high-frequency noise does not hinder the learning process.

Following denoising, contrast normalization using CLAHE (Contrast Limited Adaptive Histogram Equalization) was performed 932. CLAHE enhances local contrast in images, making subtle patterns more visible, especially in cases of uneven lighting.

Finally, the images underwent global normalization 934, where pixel values were scaled to a consistent range, typically between 0 and 1. This standardization helps stabilize and accelerate model training by ensuring that all input values contribute equally to gradient calculations and optimization.

To identify the most effective model for classifying chest X-ray images, the training engine undertook an exhaustive search across a diverse set of state-of-the-art computer vision architectures.

After this extensive benchmarking phase, EfficientNet_V2_Small 946 stood out as the top-performing architecture. EfficientNet is widely regarded for its compound scaling method, which jointly optimizes depth, width, and resolution to achieve high accuracy with fewer parameters.

The model achieved a strong accuracy of 86.07%, correctly classifying the vast majority of X-ray images. Its precision of 86.04% and recall of 86.07% reflect a well-balanced sensitivity and specificity. The F1 score of 85.95% further supports the model's reliability in maintaining a consistent tradeoff between these metrics. Moreover, the mean per class accuracy of 86.70% indicates that the model does not disproportionately favor dominant classes-a critical consideration in medical imaging where rare conditions must be identified with the same diligence as common ones.

Example 4. Retrieval-Augmented Generation (RAG)—Custom Knowledge Integration for Intelligent Chatbots FIG. 10 shows how text-based training data may be scanned and added to an LLM's RAG pipeline.

To enable domain-specific conversational intelligence 908, in some embodiments, the system may use a robust Retrieval-Augmented Generation (RAG) pipeline 916, designed to seamlessly integrate a user's custom knowledge base with the power of large language models (LLMs). This architecture ensures that chatbot interactions are not only fluent and contextually aware but also grounded in up-to-date and accurate domain-specific content.

The RAG workflow begins when a user provides their own knowledge base, which includes documents in various formats such as PDFs and Word files. Once the raw text has been extracted, it is segmented into smaller, coherent chunks (typically a few hundred words) to allow for more granular indexing and retrieval 936. Each chunk is then transformed into a high-dimensional vector 938 representation through a process called embedding. This step utilizes a pre-trained embedding model—such as Sentence-BERT or OpenAI's embedding model—that captures the semantic meaning of the text and encodes it into a numerical vector.

These vectors are then stored in a vector database which forms the core of the retrieval system, allowing for efficient similarity-based searches using cosine distance or other distance metrics.

During chatbot interaction, when a user query is received, it is also embedded into the same vector space. The system then performs a vector similarity search to retrieve the most semantically relevant document chunks from the user's indexed knowledge base. This retrieval step is critical—it grounds the language model's (in this example Llama-4-Maverick) 948 generation process in authoritative, user-specific content, enabling the system to answer questions with precise, up-to-date knowledge. For example, a legal chatbot can answer queries using the most recent regulatory documents provided by the user, or a technical assistant can guide users based on internal manuals or training guides.

The final step in the flow is response generation, where the LLM 948 combines the user query and the retrieved contextual information to formulate a coherent and relevant response. The output is not merely based on the model's pretraining but is augmented by the user's proprietary knowledge, allowing for accurate and explainable results even in niche domains.

These four examples demonstrate how different domain specific models are built by following the automated steps from selection of domain dataset 900, model type detection 918, automated data preparation 920 and automated model exploring and training 940.

The invention claimed is:

1. An automated method for transforming query data and training data into output results using a plurality of process steps, said method comprising:

receiving a plurality of training data, at least one output type election, and at least one knowledge domain election into computer memory;

using at least one processor to automatically clean said plurality of training data by correcting each said training data for any of low variance data, missing data, outlier data, and lack of normalization or statistical standardization in said training data, as well as any additional cleaning methods provided by a shared knowledge base, thus producing a plurality of cleaned training data;

reducing the dimensionality of said plurality of cleaned training data by using at least one processor and any of principal component analysis (PCA), truncated singular value decomposition (SVD), linear discriminant analysis (LDA), and t-Distributed Stochastic Neighbor Embedding (SNE), on each said cleaned training data, thus producing a plurality of compacted cleaned training data;

using a Large Language Model (LLM) based data fusion engine and any of schema alignment, key matching, column normalization, and temporal and spatial joins algorithms to fuse said plurality of compacted cleaned training data, thus producing fused compacted cleaned training data;

using said fused compacted cleaned training data to iteratively train a plurality of candidate domain-specific AI models comprising any of an LLM coded model, machine learning model, or other neural network by iteratively training these candidate domain-specific AI models with a first training subset of said fused compacted cleaned training data, thus producing candidate domain specific AI models;

wherein using said fused compacted cleaned training data to iteratively train a candidate domain-specific AI model comprises using a Retrieval-Augmented Generation (RAG) LLM; and when said training data has a memory size less than a preset RAG chunk limit, then using any of at least one processor and at least one machine learning engine to handle the training data in one pass, otherwise automatically breaking said training data into multiple chunks, and handing the multiple chunks using a pretrained embedding model;

validating said candidate domain-specific AI models with a second validation subset of said fused compacted cleaned training data, and determining any of accuracy and training efficiency of said candidate domain-specific AI models using a third test subset of said fused compacted training data, and selecting, from said plurality of candidate domain-specific AI models, domain-specific AI model from those iterations that is optimized for a function of accuracy and efficiency (optimized domain-specific AI model);

storing said optimized domain-specific AI model and said knowledge domain election in said shared knowledge base;

receiving said query data, and using said knowledge domain election and any of said optimized domain-specific AI models or other optimized domain-specific AI models previously stored in said knowledge base to automatically generate output results according to said query data and said output election.

2. The method of claim 1, further storing said optimized domain-specific AI models and said knowledge domain election in said shared knowledge base along with any of said training data, output type election, compacted cleaned training data; and fused compacted cleaned training data, and in said knowledge base over a plurality of sessions;

and for any individual session, using any of that session's said knowledge domain, output type election, compacted cleaned training data, and fused compacted cleaned training data to determine which optimized domain-specific AI model, from either that session's newly generated optimized domain-specific AI models, or previously stored optimized domain specific AI models to use to automatically generate said output results.

3. The method of claim 2, further using an LLM to determine which optimized domain-specific AI models, from either that session's newly generated optimized domain-specific AI models, or previously stored optimized domain-specific AI models, to use to automatically generate said output results.

4. The method of claim 1, further using at least one graphical user interface to either examine, enter or override any of said training data, said output type election, said knowledge domain election, any of data cleaning methods, any of dimensionality reduction methods, any of data fusion methods, any of LLM training methods, any of validation methods, and choice of said optimized domain-specific AI model.

5. The method of claim 1, further using at least one AI agent to automatically perform any of said process steps including cleaning, reducing dimensionality, fusing, training, validation, storing in said shared knowledge base, and automatically generating output results.

6. The method of claim 1, wherein said LLM, Retrieval-Augmented Generation (RAG) LLM, or other neural network comprises any of ML.NET, Tensorflow, SKLearn, Keras, NumPy, Pandas, XGBoost engines.

7. The method of claim 1, further generating said plurality of candidate domain-specific AI models by using any of evolutionary genetic algorithm, reinforcement learning, and random forest model processes.

8. The method of claim 1, wherein validating said candidate domain-specific AI models comprises automatically determining a fitness function for each candidate domain specific AI model, said fitness function comprising a ratio of an accuracy of a given candidate domain-specific AI model, divided by the training time required to generate said given candidate domain-specific AI model;

wherein said method chooses those candidate domain-specific AI models with a highest fitness ratio.

9. The method of claim 8, wherein validating said candidate domain-specific AI models further uses efficient compute frontier methods to determine training efficiency, said efficient compute frontier methods configured to determine, over a model/methods space, a point of diminishing returns where increasing theory or AI engine complexity or training time yields no significant improvement in performance.

10. The method of claim 1, further using an inference engine comprising any of a natural language processor (NLP), large language model (LLM), and said shared knowledge base, to determine said preset chunk limit, and/or determine said pretrained embedding mode.

11. The method of claim 1, wherein said method uses a plurality of different agents, and said knowledge base further comprises knowledge base sections specific to at least some of said plurality of different agents.

12. The method of claim 1, wherein said knowledge base further comprises a plurality of additional training data, further using a training AI model to determine knowledge domain gaps between any of said training data, output type election, knowledge domain election, or query data, and automatically select said additional training data, and use said additional training data to produce additional optimized domain-specific AI models in response to any of said training data, output type election, knowledge domain election, or query data.

13. The method of claim 1, wherein at least some of said plurality of training data is formatted in any of columns and categorical columns, and using at least one said processor to automatically clean said plurality of training data using at least one said processor to compute, for each said column and categorical column, a percentage of missing values and a normality score via D'Agostino's K-squared test; and using said at least one processor to perform any of automatically deleting, imputing or dropping said columns and said categorical columns;

using at least one said processor to identify said categorical columns by data type and distinct-value count, and encoding each using any of One-Hot, Label, Ordinal, or Binary Encoding based on cardinality and downstream model requirements;

detecting outliers by using at least one said processor to apply any of Z-Score filtering for near-normal columns, IQR filtering for skewed columns, or Isolation Forest algorithms; and scaling those numeric columns comprising numeric data by any of min-max or robust (median/IQR) normalization, depending on each said numeric column's skewness, thus producing said plurality of cleaned training data.

14. The method of claim 1, wherein said Large Language Model (LLM) based data fusion engine further operates by automatically generating a JSON summary of each said compacted cleaned training data, said JSON summary comprising any of listing column names, data types, sample counts, and schema identifiers;

concatenating said JSON summaries using fusion instructions into a single prompt;

said fusion instructions comprising any of align schemas; match keys; normalize formats; perform temporal joins instructions;

submitting said single prompt to a transformer LLM, and using said transformer LLM to generate fusing Python code that reads each dataset into a DataFrame, renames and type-casts columns per a unified mapping, applies column normalization, merges said DataFrames on specified keys, and writes a fused output file; and automatically executing said fusing Python code in a sandboxed container, thus producing said fused compacted cleaned training data.

15. The method of claim 14, wherein when said fusing Python code creates any runtime exceptions with runtime error codes, then resubmitting said single prompt to said transformer LLM, along with said runtime error codes, and reanalyzing said single prompt until said fusing Python code runs without creating any of said runtime exceptions.

16. The method of claim 1, wherein using said fused compacted cleaned training data to iteratively train and validate said candidate domain-specific AI model comprises:
  using a training LLM to generate training Python code that performs the steps of
    a) importing requisite AI libraries comprising any of scikit-learn, TensorFlow, and Py Torch libraries;
    b) splitting said fused compacted cleaned training data into said first training subset, second validation subset, and third test subsets;
    c) Defining said candidate domain-specific AI model by using metadata, and at least an Efficient Compute Frontier (ECF) algorithm;
    d) Running (instantiating) said candidate domain-specific AI model according to a chosen loss function and optimizer, and using said first training subset and second validation subset to determine any of said accuracy and training efficiency of said candidate domain-specific AI model;
  and automatically executing said training Python code in a sandboxed environment.

17. The method of claim 16, wherein when said training Python code creates any runtime exceptions with runtime error codes, then resubmitting said runtime error codes and the previous prompt to said training LLM, and repeating the process iteratively until said training Python code runs without creating any said runtime error codes.

18. An automated method for transforming query data and training data into output results using a plurality of process steps, said method comprising:
  receiving a plurality of training data, at least one output type election, and at least one knowledge domain election into computer memory;
  using at least one processor to automatically clean said plurality of training data by correcting each said training data for any of low variance data, missing data, outlier data, and lack of normalization or statistical standardization in said training data, as well as any additional cleaning methods provided by a shared knowledge base, thus producing a plurality of cleaned training data;
  reducing the dimensionality of said plurality of cleaned training data by using at least one processor and any of principal component analysis (PCA), truncated singular value decomposition (SVD), linear discriminant analysis (LDA), and t-Distributed Stochastic Neighbor Embedding (SNE), on each said cleaned training data, thus producing a plurality of compacted cleaned training data;
  using a Large Language Model (LLM) based data fusion engine and any of schema alignment, key matching, column normalization, and temporal and spatial joins algorithms to fuse said plurality of compacted cleaned training data, thus producing fused compacted cleaned training data;
  using said fused compacted cleaned training data to iteratively train a candidate domain-specific AI model comprising any of an LLM coded model, machine learning model, or other neural network by iteratively training said candidate domain-specific AI model with a first training subset of said fused compacted cleaned training data, thus producing candidate domain specific AI models;
  wherein using said fused compacted cleaned training data to iteratively train a candidate domain-specific AI model comprises using a Retrieval-Augmented Generation (RAG) LLM; and
  when said training data has a memory size less than a preset RAG chunk limit, then using any of at least one processor and at least one machine learning engine to handle the training data in one pass, otherwise automatically breaking said training data into multiple chunks, and handing the multiple chunks using a pretrained embedding model;
  validating said candidate domain-specific AI models with a second validation subset of said fused compacted cleaned training data, and determining any of accuracy and training efficiency of said candidate domain-specific AI models using a third test subset of said fused compacted training data, and selecting a domain-specific AI model from those iterations for optimized accuracy and efficiency criteria;
  storing said domain-specific AI model and said knowledge domain election in said shared knowledge base;
  receiving said query data, and using said knowledge domain election and any of said domain-specific AI models or other domain-specific AI models previously stored in said knowledge base to automatically generate output results according to said query data and said output election.

19. An automated method for transforming query data and training data into output results using a plurality of process steps, said method comprising:
  receiving a plurality of training data, at least one output type election, and at least one knowledge domain election into computer memory;
  using at least one processor to automatically clean said plurality of training data by correcting each said training data for any of low variance data, missing data, outlier data, and lack of normalization or statistical standardization in said training data, as well as any additional cleaning methods provided by a shared knowledge base, thus producing a plurality of cleaned training data;
  reducing the dimensionality of said plurality of cleaned training data by using at least one processor and any of principal component analysis (PCA), truncated singular value decomposition (SVD), linear discriminant analysis (LDA), and t-Distributed Stochastic Neighbor Embedding (SNE), on each said cleaned training data, thus producing a plurality of compacted cleaned training data;
  using a Large Language Model (LLM) based data fusion engine and any of schema alignment, key matching, column normalization, and temporal and spatial joins algorithms to fuse said plurality of compacted cleaned training data, thus producing fused compacted cleaned training data;
  wherein said Large Language Model (LLM) based data fusion engine further operates by automatically generating a JSON summary of each said compacted cleaned training data, said JSON summary comprising any of listing column names, data types, sample counts, and schema identifiers;
  concatenating said JSON summaries using fusion instructions into a single prompt;
  said fusion instructions comprising any of align schemas; match keys; normalize formats; perform temporal joins instructions;

submitting said single prompt to a transformer LLM, and using said transformer LLM to generate fusing Python code that reads each dataset into a DataFrame, renames and type-casts columns per a unified mapping, applies column normalization, merges said DataFrames on specified keys, and writes a fused output file; and automatically executing said fusing Python code in a sandboxed container, thus producing said fused compacted cleaned training data;

using said fused compacted cleaned training data to iteratively train a candidate domain-specific AI model comprising any of an LLM coded model, machine learning model, or other neural network by iteratively training said candidate domain-specific AI model with a first training subset of said fused compacted cleaned training data, thus producing candidate domain specific AI models;

validating said candidate domain-specific AI models with a second validation subset of said fused compacted cleaned training data, and determining any of accuracy and training efficiency of said candidate domain-specific AI models using a third test subset of said fused compacted training data, and selecting a-domain-specific AI model from those iterations for optimized accuracy and efficiency criteria;

storing said domain-specific AI model and said knowledge domain election in said shared knowledge base;

receiving said query data, and using said knowledge domain election and any of said domain-specific AI models or other domain-specific AI models previously stored in said knowledge base to automatically generate output results according to said query data and said output election.

20. An automated method for transforming query data and training data into output results using a plurality of process steps, said method comprising:

receiving a plurality of training data, at least one output type election, and at least one knowledge domain election into computer memory;

using at least one processor to automatically clean said plurality of training data by correcting each said training data for any of low variance data, missing data, outlier data, and lack of normalization or statistical standardization in said training data, as well as any additional cleaning methods provided by a shared knowledge base, thus producing a plurality of cleaned training data;

reducing the dimensionality of said plurality of cleaned training data by using at least one processor and any of principal component analysis (PCA), truncated singular value decomposition (SVD), linear discriminant analysis (LDA), and t-Distributed Stochastic Neighbor Embedding (SNE), on each said cleaned training data, thus producing a plurality of compacted cleaned training data;

using a Large Language Model (LLM) based data fusion engine and any of schema alignment, key matching, column normalization, and temporal and spatial joins algorithms to fuse said plurality of compacted cleaned training data, thus producing fused compacted cleaned training data;

using said fused compacted cleaned training data to iteratively train a candidate domain-specific AI model comprising any of an LLM coded model, machine learning model, or other neural network by iteratively training said candidate domain-specific AI model with a first training subset of said fused compacted cleaned training data, thus producing candidate domain specific AI models;

wherein using said fused compacted cleaned training data to iteratively train and validate said candidate domain-specific AI model comprises:

using a training LLM to generate training Python code that performs the steps of e) importing requisite AI libraries comprising any of scikit-learn, TensorFlow, and PyTorch libraries;

f) splitting said fused compacted cleaned training data into said first training subset, second validation subset, and third test subsets;

g) Defining said candidate domain-specific AI model by using metadata, and at least an Efficient Compute Frontier (ECF) algorithm;

h) Running (instantiating) said candidate domain-specific AI model according to a chosen loss function and optimizer, and using said first training subset and second validation subset to determine any of said accuracy and training efficiency of said candidate domain-specific AI model;

and automatically executing said training Python code in a sandboxed environment;

validating said candidate domain-specific AI models with a second validation subset of said fused compacted cleaned training data, and determining any of accuracy and training efficiency of said candidate domain-specific AI models using a third test subset of said fused compacted training data, and selecting a-domain-specific AI model from those iterations for optimized accuracy and efficiency criteria;

storing said domain-specific AI model and said knowledge domain election in said shared knowledge base;

receiving said query data, and using said knowledge domain election and any of said domain-specific AI models or other domain-specific AI models previously stored in said knowledge base to automatically generate output results according to said query data and said output election.

* * * * *